United States Patent
Gao et al.

(10) Patent No.: US 12,461,346 B2
(45) Date of Patent: Nov. 4, 2025

(54) OPTICAL IMAGING LENS ASSEMBLY

(71) Applicant: Zhejiang Sunny Optics Co., Ltd., Yuyao (CN)

(72) Inventors: Jinbo Gao, Yuyao (CN); Yuhao Wang, Yuyao (CN); Lingbo He, Yuyao (CN); Lin Huang, Yuyao (CN); Fujian Dai, Yuyao (CN); Liefeng Zhao, Yuyao (CN)

(73) Assignee: Zhejiang Sunny Optics Co., Ltd., Yuyao (CN)

( * ) Notice: Subject to any disclaimer, the term of this patent is extended or adjusted under 35 U.S.C. 154(b) by 705 days.

(21) Appl. No.: 17/572,506

(22) Filed: Jan. 10, 2022

(65) Prior Publication Data

US 2022/0236539 A1 Jul. 28, 2022

(30) Foreign Application Priority Data

Jan. 25, 2021 (CN) .......................... 202110095943.7

(51) Int. Cl.
  *G02B 13/00* (2006.01)
  *G02B 9/60* (2006.01)
  *G02F 1/29* (2006.01)

(52) U.S. Cl.
  CPC .......... *G02B 13/0075* (2013.01); *G02B 9/60* (2013.01); *G02B 13/0045* (2013.01); *G02B 13/006* (2013.01); *G02F 1/29* (2013.01)

(58) Field of Classification Search
  CPC ...... G02B 13/12; G02B 13/18; G02B 13/006; G02B 13/0045; G02B 13/0075;
  (Continued)

(56) References Cited

U.S. PATENT DOCUMENTS

| | | | |
|---|---|---|---|
| 4,679,918 A | * | 7/1987 | Ace .......................... G02C 7/02 351/159.62 |
| 10,175,493 B1 | * | 1/2019 | Chen .................. G02B 27/0955 |

(Continued)

FOREIGN PATENT DOCUMENTS

| | | |
|---|---|---|
| CN | 106094070 A | 11/2016 |
| CN | 108803016 A | 11/2018 |

(Continued)

OTHER PUBLICATIONS

Takashi Kaneko et al., A New, Compact and Quick-Response Dynamic Focusing Lens, 1997, pp. 1-4 [online], [retrieved Jun. 23, 2024], retrieved from the Internet <URL: https://ieeexplore.ieee.org/stamp/stamp.jsp?tp=&arnumber=613582>. (Year: 1997).*

(Continued)

*Primary Examiner* — Jie Lei
(74) *Attorney, Agent, or Firm* — Reising Ethington P.C.

(57) ABSTRACT

The present disclosure provides an optical imaging lens assembly, along an optical axis from an object side to an image side, sequentially includes: a first lens having positive refractive power; an autofocus component; a second lens having a refractive power; a third lens having a refractive power; a fourth lens having a refractive power; and at least one subsequent lens having a refractive power. At least one surface from an object-side surface of the first lens to an image-side surface of the at least one subsequent lens is an aspheric surface; the first lens and the autofocus component are cemented together; and a radius of curvature of an image-side surface of the autofocus component is variable.

15 Claims, 34 Drawing Sheets

(58) Field of Classification Search
CPC ... G02B 9/60; G02B 9/62; G02B 3/14; G02B 13/00; G02B 13/009; G02B 13/004; G02B 13/14; G02F 1/29; H04N 23/55; H04N 23/54
USPC ....... 359/713, 714, 756, 752, 757, 758, 728, 359/739, 682, 658
See application file for complete search history.

(56) References Cited

U.S. PATENT DOCUMENTS

| | | | | |
|---|---|---|---|---|
| 10,368,002 | B2* | 7/2019 | Kunick | H04N 23/55 |
| 2011/0292266 | A1* | 12/2011 | Duston | G02B 13/006 |
| | | | | 348/308 |
| 2016/0231533 | A1* | 8/2016 | Mercado | G02F 1/1533 |
| 2016/0313537 | A1* | 10/2016 | Mercado | G02B 13/0045 |
| 2016/0377947 | A1* | 12/2016 | Scepanovic | G02F 1/157 |
| | | | | 455/566 |
| 2017/0235113 | A1* | 8/2017 | Mccafferty | G02B 3/14 |
| | | | | 359/693 |
| 2018/0275320 | A1* | 9/2018 | Hsieh | G02B 13/004 |
| 2018/0372985 | A1* | 12/2018 | Nunnink | H04N 23/54 |
| 2019/0171878 | A1* | 6/2019 | Jeong | G02B 7/028 |
| 2019/0187455 | A1* | 6/2019 | Iwasaki | G06V 40/19 |
| 2019/0346661 | A1* | 11/2019 | Yeh | G02B 13/0045 |
| 2021/0048629 | A1* | 2/2021 | Kuo | G02B 26/004 |
| 2022/0043190 | A1* | 2/2022 | Kwon | G02B 13/0075 |
| 2022/0236515 | A1* | 7/2022 | Wang | G02B 3/0043 |

FOREIGN PATENT DOCUMENTS

| | | | | |
|---|---|---|---|---|
| CN | 109884788 A | | 6/2019 | |
| CN | 111025438 A | * | 4/2020 | ............... G02B 3/14 |
| DE | 3346785 A1 | * | 6/1984 | |
| JP | 2009139397 A | | 6/2009 | |
| KR | 20090027330 | * | 3/2009 | ............. G02B 13/18 |
| WO | WO-2007085658 A1 | * | 8/2007 | ......... G02B 13/0045 |

OTHER PUBLICATIONS

Herbert Gross (Ed.), Handbook of Optical Systems, vol. 3, 377-379 (2007). (Year: 2007).*
English translation of KR 20090027330. (Year: 2009).*
Chinese Office Action, in English language, corresponding to application 202110959.43.7, dated Nov. 9, 2023, 9 pages.

* cited by examiner

OPTICAL IMAGING LENS ASSEMBLY

CROSS-REFERENCE TO RELATED APPLICATIONS

This application claims benefit of priority to Chinese Patent Application No. 202110095943.7 filed on Jan. 25, 2021 before the China National Intellectual Property Administration, the entire disclosure of which is incorporated herein by reference in its entity.

TECHNICAL FIELD

The present disclosure relates to the field of optical elements, and in particular, to an optical imaging lens assembly.

BACKGROUND

With the rapid development of portable electronic products such as smart phones, people have more and more diversified requirements for camera and photography functions of smart phones in different scenarios. Based on the thin and light design concept of smart phones, front optical imaging lens assemblies mounted on the smart phones often use small fixed-focus systems to better match the thin and light mobile phones. Although the fixed-focus design of the optical imaging lens assemblies may effectively achieve miniaturization of the lens assemblies, it cannot meet the needs for imaging effects in different shooting scenarios due to its lack of a zoom characteristic, which limits further development of mobile phone lens assemblies in a wide range.

Therefore, how to design a miniaturized optical imaging lens assembly having autofocus function to reflect high-performance imaging quality becomes a major challenge in the field of lens assembly design.

SUMMARY

One aspect of the present disclosure provides an optical imaging lens assembly, and the optical imaging lens assembly along an optical axis from an object side to an image side sequentially includes: a first lens having positive refractive power; an autofocus component; a second lens having a refractive power; a third lens having a refractive power; a fourth lens having a refractive power; and at least one subsequent lens having a refractive power. The first lens and the autofocus component are cemented together; a radius of curvature of an image-side surface of the autofocus component is variable; and at least one surface from an object-side surface of the first lens to an image-side surface of the at least one subsequent lens is an aspheric surface.

In an embodiment, a total effective focal length f of the optical imaging lens assembly and an effective focal length f1 of the first lens may satisfy: $1.0<f/f1<1.5$.

In an embodiment, an effective focal length f2 of the second lens and an effective focal length f3 of the third lens may satisfy: $1.0<f3/f2<4.5$.

In an embodiment, an effective focal length f4 of the fourth lens and a radius of curvature R8 of an image-side surface of the fourth lens may satisfy: $-6.5<f4/R8<-1.0$.

In an embodiment, a radius of curvature R3 of an object-side surface of the second lens and a radius of curvature R4 of an image-side surface of the second lens may satisfy: $4.0<R3/R4<7.0$.

In an embodiment, a radius of curvature R9 of an object-side surface of the fifth lens and a radius of curvature R10 of an image-side surface of the fifth lens may satisfy: $0.5<|R9/R10|<3.5$.

In an embodiment, a sum of center thicknesses D of the autofocus component and the first lens on the optical axis and a sum of center thicknesses $\Sigma CT$ of all lenses from the first lens to the at least one subsequent lens on the optical axis may satisfy: $2.0<\Sigma CT/D<3.5$.

In an embodiment, a distance TTL from the object-side surface of the first lens to an imaging plane of the optical imaging lens assembly on the optical axis, a sum of center thicknesses D of the autofocus component and the first lens on the optical axis, and a center thickness CT1 of the first lens on the optical axis may satisfy: $3.0<TTL/(D+CT1)<4.0$.

In an embodiment, a total effective focal length f of the optical imaging lens assembly and a radius of curvature R1 of the object-side surface of the first lens may satisfy: $2.0<f/R1<3.0$.

In an embodiment, a center thickness CT4 of the fourth lens on the optical axis and a center thickness CT5 of the fifth lens on the optical axis may satisfy: $0.5<CT4/CT5<2.5$.

In an embodiment, a center thickness CT3 of the third lens on the optical axis and a center thickness CT2 of the second lens on the optical axis may satisfy: $1.0<CT3/CT2<1.5$.

In an embodiment, a spaced interval T34 between the third lens and the fourth lens on the optical axis and a spaced interval $T_{T-2}$ between the autofocus component and the second lens on the optical axis may satisfy: $1.0<T34/T_{T-2}<3.5$.

In an embodiment, the distance TTL from the object-side surface of the first lens to the imaging plane of the optical imaging lens assembly on the optical axis, and a half of a diagonal length ImgH of an effective pixel area on the imaging plane of the optical imaging lens assembly may satisfy: $1.5<TTL/ImgH<2.0$.

In an embodiment, the distance TTL from the object-side surface of the first lens to an imaging plane of the optical imaging lens assembly on the optical axis, and the total effective focal length f of the optical imaging lens assembly may satisfy: $1.0<TTL/f<1.5$.

In an embodiment, the autofocus component along the optical axis from the first lens to the second lens sequentially includes: a light-transmitting module, a liquid material, and a flexible film, where an object-side surface of the light-transmitting module and the first lens are cemented together; an image-side surface of the light-transmitting module and an object-side surface of the liquid material are cemented; and the flexible film is arranged on an image-side surface of the liquid material.

By reasonably distributing the refractive powers and optimizing the optical parameters, the present disclosure provides an optical imaging lens assembly having a stable image quality, an autofocus function, a miniaturization, and a good imaging quality and being suitable for portable electronic products.

BRIEF DESCRIPTION OF THE DRAWINGS

By reading detailed description of non-limiting embodiments with reference to the following accompanying drawings, other features, objectives and advantages of the present disclosure will be more apparent.

DETAILED DESCRIPTION OF EMBODIMENTS

Figure 1:
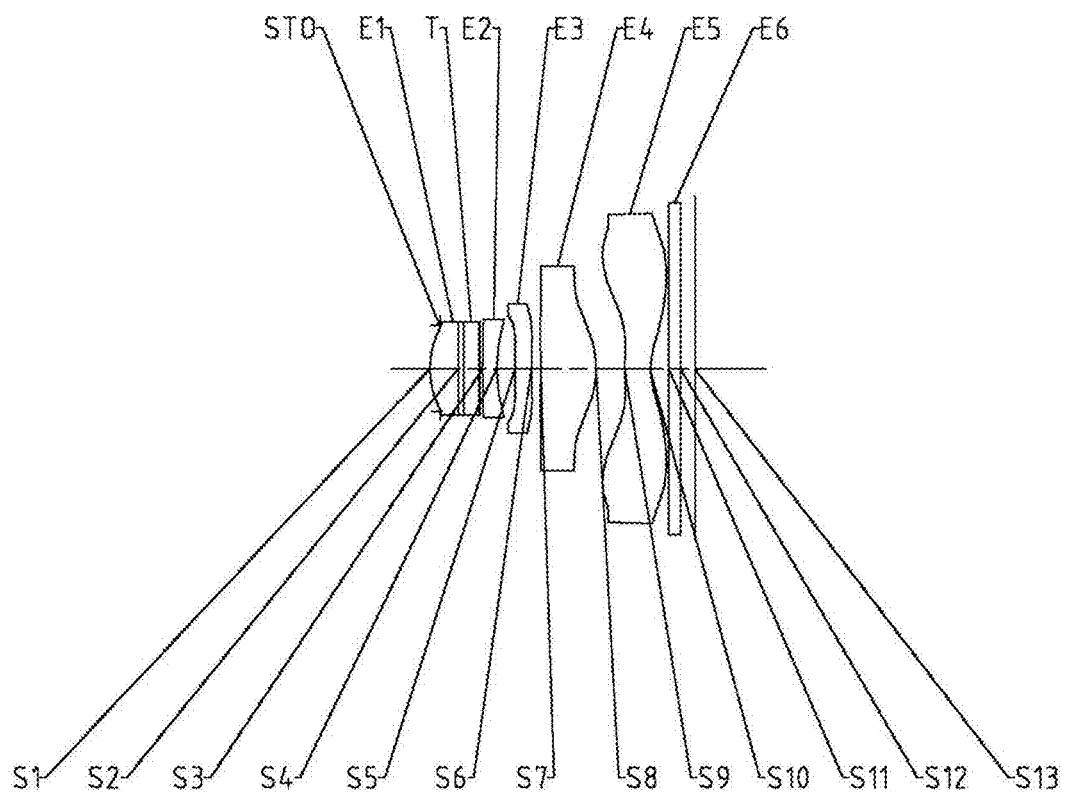
FIG. 1 is a schematic structural diagram illustrating an optical imaging lens assembly according to Example 1 of the present disclosure.

For a better understanding of the present disclosure, various aspects of the present disclosure will be described in more detail with reference to the accompanying drawings. It should be understood that the detailed description is merely an illustration for the exemplary implementations of the present disclosure rather than a limitation to the scope of the present disclosure in any way. Throughout the specification, the same reference numerals designate the same elements. The expression "and/or" includes any and all combinations of one or more of the associated listed items.

It should be noted that in the specification, the expressions, such as "first," "second" and "third" are only used to distinguish one feature from another, rather than represent any limitations to the features. Thus, the first lens discussed below may also be referred to as the second lens or the third lens without departing from the teachings of the present disclosure.

In the accompanying drawings, the thicknesses, sizes and shapes of the lenses have been slightly exaggerated for the convenience of explanation. Specifically, shapes of spherical surfaces or aspheric surfaces shown in the accompanying drawings are shown by examples. That is, the shapes of the spherical surfaces or the aspheric surfaces are not limited to the shapes of the spherical surfaces or the aspheric surfaces shown in the accompanying drawings. The accompanying drawings are merely illustrative and not strictly drawn to scale.

In this text, the paraxial area refers to an area near the optical axis. If the surface of a lens is a convex surface and the position of the convex surface is not defined, it indicates that the surface of the lens is a convex surface at least in the paraxial area; and if the surface of a lens is a concave surface and the position of the concave surface is not defined, it indicates that the surface of the lens is a concave surface at least in the paraxial area. The surface closest to the object in each lens is referred to as the object-side surface, and the surface closest to the image plane in each lens is referred to as the image-side surface.

It should be further understood that the terms "comprising," "including," "having", "containing" and/or "contain," when used in the specification, specify the presence of stated features, elements and/or components, but do not exclude the presence or addition of one or more other features, elements, components and/or combinations thereof. In addition, expressions, such as "at least one of," when preceding a list of features, modify the entire list of features rather than an individual element in the list. Further, the use of "may," when describing embodiments of the present disclosure, refers to "one or more embodiments of the present disclosure." Also, the term "exemplary" is intended to refer to an example or illustration.

Unless otherwise defined, all terms (including technical and scientific terms) used herein have the same meaning as commonly understood by those of ordinary skill in the art to which the present disclosure belongs. It should be further understood that terms (i.e., those defined in commonly used dictionaries) should be interpreted as having a meaning that is consistent with their meaning in the context of the relevant art and will not be interpreted in an idealized or overly formal sense unless expressly so defined herein.

It should also be noted that the embodiments in the present disclosure and the features in the embodiments may be combined with each other on a non-conflict basis. The present disclosure will be described below in detail with reference to the accompanying drawings and in combination with the embodiments.

The features, principles, and other aspects of the present disclosure are described in detail below.

The optical imaging lens assembly according to exemplary implementations of the present disclosure may include an autofocus component and at least five lenses having refractive powers. The at least five lenses having refractive powers are a first lens, a second lens, a third lens, a fourth lens and at least one subsequent lens, respectively. The first lens, the autofocus component, the second lens, the third lens, the fourth lens and the at least one subsequent lens are sequentially arranged from the object side to the image side along the optical axis. There may be a spaced interval between the autofocus component and the second lens. There may be a spaced interval between any two adjacent lenses from the second lens to a lens closest to the image side.

According to an exemplary implementation of the present disclosure, the first lens and the autofocus component may be cemented together. By reasonably matching the refractive powers and the surface types of the first lens and the autofocus component, and effectively cementing the first lens and the autofocus component, it may not only ensure good processability of the cemented module, but also further reduce a total track length of the imaging lens assembly and make a lens assembly structure compact.

According to an exemplary implementation of the present disclosure, the autofocus component may sequentially include a light-transmitting module, a liquid material, and a flexible film from the first lens to the second lens along the optical axis. An object-side surface of the light-transmitting module may be cemented with the first lens; and an image-side surface of the light-transmitting module may be cemented with an object-side surface of the liquid material, where the light-transmitting module may be a glass plate or an optical lens. The flexible film may be arranged on an image-side surface of the liquid material.

According to an exemplary implementation of the present disclosure, a radius of curvature of an image-side surface of the autofocus component is variable, that is, the shape of the flexible film and the image-side surface of the liquid material are variable. The radius of curvature of the image-side surface of the autofocus component may be changed with the change of a distance between the optical imaging lens assembly and the object, so as to realize the autofocus function of the optical imaging lens assembly.

Figure 31A:
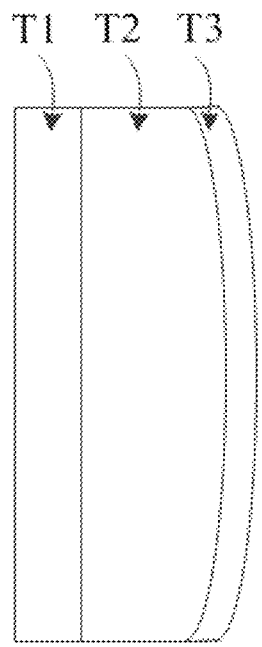
FIG. 31A and FIG. 31B respectively illustrate schematic structural diagrams of an autofocus component of the optical imaging lens assembly in the present disclosure, when distances from the object to the optical imaging lens assembly are different.
Figure 31B:
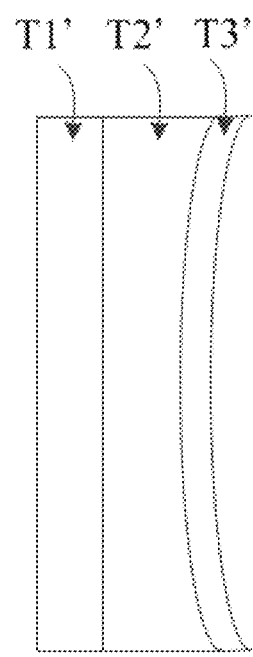

According to an exemplary implementation of the present disclosure, the autofocus component includes: the light-transmitting module, the liquid material and the flexible film. FIG. 31A shows a schematic structural diagram of the autofocus component in the present disclosure. The autofocus component includes a light-transmitting module T1, a liquid material T2, and a flexible film T3, where the image-side surface of the liquid material T2 and the flexible film T3 are both convex surfaces. FIG. 31B shows a schematic structural diagram of another autofocus component in the present disclosure. The autofocus component includes a light-transmitting module T1', a liquid material T2' and a flexible film T3', where the image-side surface of the liquid material T2' and the flexible film T3' are deformed, for example, both are changed from convex surfaces to concave surfaces. It should be understood that the image-side surface of the liquid material T2' and the flexible film T3' may both be changed from concave surfaces to convex surfaces, and the present disclosure does not specifically limit an order of changes in the types of the image-side surface of the liquid material T2' and the flexible film T3'. Specifically, the liquid material may be disposed between the light-transmitting module and the flexible film, and the liquid material may be connected to a conductive material (not shown). When an external voltage is applied to the conductive material, it may cause the image-side surface of the liquid material to deform, which further drives the flexible film to deform, so as to change a focal length of the autofocus component. Therefore, the autofocus function of the lens assembly at different object distances may be realized without changing the total track length of the optical imaging lens assembly, thereby making the optical imaging lens assembly lighter and thinner. It should be understood that the liquid material in the present disclosure does not only include one material. In actual production, in order to reasonably adjust the total effective focal length of the optical imaging lens assembly, multiple kinds of liquid materials, such as a first liquid material, or a second liquid material, may be disposed between the flexible film and the light-transmitting module according to specific needs. In addition, the first liquid material, the second liquid material, and the like are not immiscible with each other. When a voltage is applied to the conductive material, the liquid material may be deformed, which further drives shape of contact surfaces of the flexible film, the first liquid material and the second liquid material to change, so that the focal length of the autofocus component is changed, thereby adjusting the total effective focal length of the optical imaging lens assembly.

According to an exemplary implementation of the present disclosure, drive systems such as voice coil motors, microelectromechanical systems, piezoelectric systems, and memory metals may be used to apply voltage to the conductive material. The drive system may adjust the focal length of the optical imaging lens assembly to make the optical imaging lens assembly have a good imaging position, so that the optical imaging lens assembly can clearly image at different distances from the object to the optical imaging lens assembly.

In an exemplary implementation, the first lens may have a positive refractive power; the second lens may have a positive refractive power or a negative refractive power; the third lens may have a positive refractive power or a negative refractive power; the fourth lens may have a positive refractive power or a negative refractive power; and the at least one subsequent lens may have a positive refractive power or a negative refractive power.

In an exemplary implementation, by reasonably matching the refractive power and surface type of the second lens, it is beneficial to correct an off-axis aberration of the optical imaging lens assembly and improve the imaging quality. By reasonably matching the refractive power and surface type of the fourth lens, it is not only beneficial to ensure the processibility of the fourth lens, but also beneficial to reduce a chromatic aberration of the optical imaging lens assembly and improve the imaging quality of the optical imaging lens assembly. By reasonably matching the refractive power and surface type of the at least one subsequent lens, it is not only beneficial to correct the off-axis aberration of the optical imaging lens assembly, improve the imaging quality, but also is beneficial to reduce the tolerance sensitivity of the lens assembly.

In an exemplary implementation, the optical imaging lens assembly according to the present disclosure may satisfy: $1.0 < f/f1 < 1.5$, where f is a total effective focal length of the optical imaging lens assembly, and f1 is an effective focal length of the first lens. More specifically, f and f1 may further satisfy: $1.2 < f/f1 < 1.5$. Satisfying $1.0 < f/f1 < 1.5$ is conducive to the incidence of light with a large field-of-view from the object side to the first lens, and is conducive for the first lens to correct off-axis aberrations generated by subsequent lenses, and thus is conducive to improving the imaging quality of the lens assembly.

In an exemplary implementation, the optical imaging lens assembly according to the present disclosure may satisfy: $1.0 < f3/f2 < 4.5$, where f2 is an effective focal length of the second lens, and f3 is an effective focal length of the third lens. More specifically, f3 and f2 may further satisfy: $1.1 < f3/f2 < 4.4$. Satisfying $1.0 < f3/f2 < 4.5$ may increase the degree of freedom of surface changes of the second lens and the third lens, thereby improving the ability of the imaging lens assembly to correct astigmatism and field curvature.

In an exemplary implementation, the optical imaging lens assembly according to the present disclosure may satisfy: $-6.5 < f4/R8 < -1.0$, where f4 is an effective focal length of the fourth lens, and R8 is a radius of curvature of an image-side surface of the fourth lens. More specifically, f4 and R8 may further satisfy: $-6.3 < f4/R8 < -1.2$. Satisfying $-6.5 < f4/R8 < -1.0$ may effectively improve a geometric shape of the fourth lens, control the angle of light exiting from the fourth lens, and reduce the influence of ghost images.

In an exemplary implementation, the optical imaging lens assembly according to the present disclosure may satisfy: $4.0 < R3/R4 < 7.0$, where R3 is a radius of curvature of an object-side surface of the second lens, and R4 is a radius of curvature of an image-side surface of the second lens. More specifically, R3 and R4 may further satisfy: $4.1 < R3/R4 < 7.0$. Satisfying $4.0 < R3/R4 < 7.0$ may optimize the concentration of light in the second lens, reduce the sensitivity of the second lens, and improve a product yield of the second lens.

In an exemplary implementation, the optical imaging lens assembly according to the present disclosure may satisfy: $0.5 < |R9/R10| < 3.5$, where R9 is a radius of curvature of an object-side surface of the fifth lens, and R10 is a radius of curvature of an image-side surface of the fifth lens. More specifically, R9 and R10 may further satisfy: $0.6 |R9/R10| < 3.4$. Satisfying $0.5 < |R9/R10| < 3.5$ may ensure the matching of a chief ray angle (CRA) of the lens assembly with a sensor, and may effectively correct the field curvature and improve the imaging quality of the lens assembly.

In an exemplary implementation, the optical imaging lens assembly according to the present disclosure may satisfy: $2.0 < \Sigma CT/D < 3.5$, where D is a sum of center thicknesses of the autofocus component and the first lens on the optical axis, and $\Sigma CT$ is a sum of center thicknesses of all lenses from the first lens to the at least one subsequent lens on the optical axis. Satisfying $2.0 < \Sigma CT/D < 3.5$ may improve the autofocus ability of the lens assembly, may effectively correct the field curvature of the lens assembly and improve the off-axis aberration of the lens assembly, and may improve the imaging quality of the lens assembly.

In an exemplary implementation, the optical imaging lens assembly according to the present disclosure may satisfy: $3.0 < TTL/(D+CT1) < 4.0$, where TTL is a distance from the object-side surface of the first lens to an imaging plane of the optical imaging lens assembly on the optical axis, D is a sum of center thicknesses of the autofocus component and the first lens on the optical axis, and CT1 is a center thickness of the first lens on the optical axis. More specifically, TTL, D and CT1 may further satisfy: $3.1 < TTL/(D+CT1) < 3.6$. Satisfying $3.0 < TTL/(D+CT1) < 4.0$ may improve the processibility of the lens assembly, may effectively reduce an overall size of the optical imaging lens assembly, and avoid the imaging lens assembly from being too large in size.

In an exemplary implementation, the optical imaging lens assembly according to the present disclosure may satisfy: $2.0<f/R1<3.0$, where f is a total effective focal length of the optical imaging lens assembly, and R1 is a radius of curvature of the object-side surface of the first lens. More specifically, f and R1 may further satisfy: $2.2<f/R1<2.7$. Satisfying $2.0<f/R1<3.0$ may ensure that the first lens has good lens shape and processibility, so that the imaging lens assembly has the advantage of a large field-of-view, which is beneficial to control the incidence angle of the chief ray of the imaging lens assembly to the imaging plane, and is beneficial to improve a relative illumination on the imaging plane.

In an exemplary implementation, the optical imaging lens assembly according to the present disclosure may satisfy: $0.5<CT4/CT5<2.5$, where CT4 is a center thickness of the fourth lens on the optical axis, and CT5 is a center thickness of the fifth lens on the optical axis. More specifically, CT4 and CT5 may further satisfy: $0.6<CT4/CT5<2.3$. Satisfying $0.5<CT4/CT5<2.5$ may effectively reduce thickness sensitivity of the lens assembly, and may effectively correct the field curvature of the lens assembly.

In an exemplary implementation, the optical imaging lens assembly according to the present disclosure may satisfy: $1.0<CT3/CT2<1.5$, where CT3 is a center thickness of the third lens on the optical axis, and CT2 is a center thickness of the second lens on the optical axis. More specifically, CT3 and CT2 may further satisfy: $1.1<CT3/CT2<1.5$. Satisfying $1.0<CT3/CT2<1.5$ may effectively improve injection molding yields of the second lens and the third lens, improve the processibility of the lens assembly, and at the same time ensure that the lens assembly has a good imaging quality.

In an exemplary implementation, the optical imaging lens assembly according to the present disclosure may satisfy: $1.0<T34/T_{T-2}<3.5$, where T34 is a spaced interval between the third lens and the fourth lens on the optical axis, and $T_{T-2}$ is a spaced interval between the autofocus component and the second lens on the optical axis. Satisfying $1.0<T34/T_{T-2}<3.5$ may effectively reduce the thickness sensitivity of the lens assembly, which is not only conducive to arranging structural components such as spacers in the lens assembly, but also helps to improve a processing yield of the lens assembly.

In an exemplary implementation, the optical imaging lens assembly according to the present disclosure may satisfy: $1.5<TTL/ImgH<2.0$, where TTL is a distance from the object-side surface of the first lens to an imaging plane of the optical imaging lens assembly on the optical axis, and ImgH is a half of a diagonal length of an effective pixel area on the imaging plane of the optical imaging lens assembly. More specifically, TLL and ImgH may further satisfy: $1.5<TTL/ImgH<1.8$. Satisfying $1.5<TTL/ImgH<2.0$ is conducive to reducing the total track length of the lens assembly as much as possible and increasing an applicable scope of the lens assembly while ensuring the imaging quality of the lens assembly.

In an exemplary implementation, the optical imaging lens assembly according to the present disclosure may satisfy: $1.0<TTL/f<1.5$, where TTL is a distance from the object-side surface of the first lens to an imaging plane of the optical imaging lens assembly on the optical axis, and f is a total effective focal length of the optical imaging lens assembly. More specifically, TLL and f may further satisfy: $1.1<TTL/f<1.4$. Satisfying $1.0<TTL/f<1.5$ is conducive for the lens assembly to achieve characteristics such as small depth of field and high magnification, and is conducive for the imaging lens assembly to easily achieve a miniaturization.

In an exemplary implementation, the optical imaging lens assembly according to the present disclosure further includes a stop disposed between the object side and the first lens. Alternatively, the optical imaging lens assembly may further include an optical filter/protective glass for protecting a photosensitive element on the imaging plane. The present disclosure proposes an optical imaging lens assembly having characteristics such as a miniaturization, an autofocus, a stable image quality, and a high imaging quality. The optical imaging lens assembly according to the above implementations of the present disclosure may employ a plurality of lenses, such as five lenses as described above. By reasonably distributing the refractive power, the surface shape, the center thickness of each lens and the spaced intervals between the lenses along the optical axis, it may effectively converge incident light, reduce the total track length of the imaging lens assembly and improve the processability of the imaging system, thereby making the optical imaging lens assembly more conducive to production and processing.

In the implementations of the present disclosure, at least one of the surfaces of the lenses is an aspheric surface, that is, at least one of the surfaces from the object-side surface of the first lens to an image-side surface of the lens closest to the image side is an aspheric surface. The characteristic of the aspheric lens is: the curvature is continuously changing from the center of the lens to the periphery of the lens. Unlike the spherical lens with a constant curvature from the center of the lens to the periphery, the aspheric lens has a better radius of curvature characteristic, and advantages of improving the distortion aberration and improving the astigmatic aberration. The use of the aspheric lens can eliminate the aberrations that occur during the imaging as much as possible, thereby improving the imaging quality. Alternatively, at least one of the object-side surface and the image-side surface of each of the first lens, the second lens, the third lens, the fourth lens and the at least one subsequent lens is an aspheric surface. Alternatively, the object-side surface and the image-side surface of each of the first lens, the second lens, the third lens, the fourth lens and the at least one subsequent lens are aspheric surfaces.

However, it should be understood by those skilled in the art that the various results and advantages described in the present specification may be obtained by changing the number of the lenses constituting the optical imaging lens assembly without departing from the technical solution claimed by the present disclosure. For example, although the optical imaging lens assembly having five lenses or six lenses is described as an example in the implementations, the optical imaging lens assembly is not limited to include five lenses or six lenses. If desired, the optical imaging lens assembly may also include other numbers of lenses.

Specific examples of the optical imaging lens assembly that may be applied to the above implementations are further described below with reference to the accompanying drawings.

Example 1

An optical imaging lens assembly according to Example 1 of the present disclosure is described below with reference to FIGS. 1-5B. FIG. 1 is a schematic structural diagram illustrating the optical imaging lens assembly according to Example 1 of the present disclosure.

As shown in FIG. 1, the optical imaging lens assembly from an object side to an image side sequentially includes: a stop STO, a first lens E1, an autofocus component T (including a light-transmitting module, a liquid material and a flexible film), a second lens E2, a third lens E3, a fourth lens E4, a fifth lens E5, an optical filter E6 and an imaging plane S13.

The first lens E1 has a positive refractive power, an object-side surface S1 of the first lens is a convex surface, and an image-side surface S2 of the first lens is a flat surface. The second lens E2 has a negative refractive power, an object-side surface S3 of the second lens is a convex surface, and an image-side surface S4 of the second lens is a concave surface. The third lens E3 has a negative refractive power, an object-side surface S5 of the third lens is a convex surface, and an image-side surface S6 of the third lens is a concave surface. The fourth lens E4 has a positive refractive power, an object-side surface S7 of the fourth lens is a convex surface, and an image-side surface S8 of the fourth lens is a convex surface. The fifth lens E5 has a negative refractive power, an object-side surface S9 of the fifth lens is a convex surface, and an image-side surface S10 of the fifth lens is a concave surface. The optical filter E6 has an object-side surface S11 and an image-side surface S12. The first lens E1 and the light-transmitting module may be cemented together. Light from an object sequentially passes through the surfaces S1 to S12 and is finally imaged on the imaging plane S13.

Table 1 is a table illustrating basic parameters of the optical imaging lens assembly of Example 1, where the units for the radius of curvature, the thickness/distance and the focal length are millimeter (mm).

realizing the autofocus function of the optical imaging lens assembly. Specifically, when the distance D1 between the optical imaging lens assembly and the object is 350 mm, the image-side surface of the autofocus component T (i.e., the flexible film surface and the image-side surface of the liquid material) is a convex surface, and the radius of curvature RT is −267.7300 mm. When the distance D1 between the optical imaging lens assembly and the object is 150 mm, the image-side surface of the autofocus component T is a convex surface, and the radius of curvature RT is −76.5000. When the distance D1 between the optical imaging lens assembly and the object is infinite, the image-side surface of the autofocus component T is a concave surface, and the radius of curvature RT is 303.2000.

In this example, the total effective focal length f of the optical imaging lens assembly is 3.66 mm, the total track length TTL of the optical imaging lens assembly (that is, a distance from the object-side surface of the first lens E1 to the imaging plane S13 of the optical imaging lens assembly on the optical axis) is 4.69 mm, a half of a diagonal length ImgH of an effective pixel area on the imaging plane S13 of the optical imaging lens assembly is 3.01 mm, a half of a maximum field-of-view Semi-FOV of the optical imaging lens assembly is 38.5°, and an F number Fno of the optical imaging lens assembly is 2.47.

In Example 1, the object-side surface S1 of the first lens E1, and the object-side surface and the image-side surface of each of the second lens E2 to the fifth lens E5 are aspheric. The surface shape x of each aspheric lens may be defined by using, but not limited to, the following aspheric formula:

TABLE 1

| Surface number | Surface type | Radius of curvature | Thickness/ Distance | Material Refractive index | Abbe number | Focal length | Conic coefficient |
|---|---|---|---|---|---|---|---|
| OBJ | Spherical | infinite | D1 | | | | |
| STO | Spherical | infinite | −0.1775 | | | | |
| S1 | Aspheric | 1.5952 | 0.4955 | 1.55 | 56.1 | 2.94 | −0.6269 |
| S2 | Spherical | infinite | 0.0000 | | | | |
| | Spherical | infinite | 0.1000 | 1.52 | 64.2 | | |
| | Spherical | infinite | 0.2650 | 1.57 | 29.9 | | |
| | Spherical | RT | 0.0200 | 1.53 | 65.4 | | |
| | Spherical | | 0.0500 | | | | |
| S3 | Aspheric | 11.9447 | 0.2500 | 1.67 | 20.4 | −5.27 | −90.0000 |
| S4 | Aspheric | 2.6917 | 0.3251 | | | | −7.8164 |
| S5 | Aspheric | 7.9669 | 0.2900 | 1.67 | 20.4 | −22.77 | 66.6825 |
| S6 | Aspheric | 5.1482 | 0.1637 | | | | −15.6131 |
| S7 | Aspheric | 28.7176 | 0.9800 | 1.55 | 56.1 | 3.37 | −90.0000 |
| S8 | Aspheric | −1.9411 | 0.5051 | | | | −2.7546 |
| S9 | Aspheric | 2.8199 | 0.4500 | 1.54 | 55.8 | −3.04 | −42.9937 |
| S10 | Aspheric | 0.9758 | 0.3324 | | | | −5.6248 |
| S11 | Spherical | infinite | 0.2100 | 1.52 | 64.2 | | |
| S12 | Spherical | infinite | 0.2510 | | | | |
| S13 | Spherical | infinite | | | | | |

In this example, an object-side surface of the liquid material and an image-side surface the light-transmitting module may be cemented together. By changing the radius of curvature of a flexible film surface of the autofocus component T and the radius of curvature of an image-side surface of the liquid material of the autofocus component T, the total effective focal length of the optical imaging lens assembly may be changed with the change of a distance from the object to the optical imaging lens assembly, thereby $$x = \frac{ch^2}{1 + \sqrt{1 - (k+1)c^2h^2}} + \sum A_i h^i \quad (1)$$

Where, x is the sag—the axis-component of the displacement of the surface from the aspheric vertex, when the surface is at height h from the optical axis; c is a paraxial curvature of the aspheric surface, c=1/R (that is, the paraxial curvature c is reciprocal of the radius of curvature R in the above Table 1); k is a conic coefficient; Ai is a correction coefficient for the i-th order of the aspheric surface. Table 2 below shows high-order coefficients $A_4$, $A_6$, $A_8$, $A_{10}$, $A_{12}$, $A_{14}$, $A_{16}$, $A_{18}$ and $A_{20}$ applicable to each aspheric surface S1, S3 to S10 in Example 1.

TABLE 2

| Surface number | A4 | A6 | A8 | A10 | A12 | A14 | A16 | A18 | A20 |
|---|---|---|---|---|---|---|---|---|---|
| S1 | 1.5098E−02 | 5.5302E−04 | −2.2604E−04 | −2.1015E−04 | −1.9595E−04 | −1.2808E−04 | −7.9019E−05 | −3.1954E−05 | −1.0695E−05 |
| S3 | −1.7375E−02 | 5.1301E−03 | 1.2219E−03 | 7.8673E−04 | 1.5188E−04 | −1.5359E−05 | −5.6293E−05 | −2.4738E−05 | −8.0052E−06 |
| S4 | 9.7544E−03 | 1.6816E−03 | −8.4131E−04 | −9.3136E−05 | −1.5511E−04 | −6.5502E−05 | −5.7772E−05 | −2.3174E−05 | −1.0322E−05 |
| S5 | −1.6586E−01 | −1.0048E−02 | −4.3228E−03 | −1.2084E−03 | −6.6333E−04 | −2.4127E−04 | −9.1039E−05 | −3.0799E−05 | −7.4975E−06 |
| S6 | −2.0442E−01 | 1.7997E−02 | −4.6055E−04 | 1.9345E−03 | 7.4145E−05 | 1.6625E−04 | 6.9193E−05 | 1.6821E−05 | 9.5532E−06 |
| S7 | −3.9397E−02 | 2.5480E−02 | −1.0296E−02 | 1.5308E−03 | −1.3877E−04 | −5.5311E−05 | 5.0065E−05 | −1.2090E−05 | 7.0367E−07 |
| S8 | 2.1953E−01 | 8.0133E−02 | −5.4350E−02 | 5.6076E−03 | 3.0058E−03 | −3.2241E−04 | −8.2142E−04 | 2.7681E−04 | −2.1722E−05 |
| S9 | −1.0169E+00 | 5.1105E−01 | −1.8813E−01 | 6.0214E−02 | −1.8970E−02 | 7.2571E−03 | −2.8430E−03 | 7.7543E−04 | −9.9390E−05 |
| S10 | −1.0636E+00 | 1.8849E−01 | −7.5525E−02 | 3.4940E−02 | −1.0004E−02 | 4.9682E−03 | −1.6210E−03 | 5.3807E−04 | −1.4160E−04 |

Figure 2A:
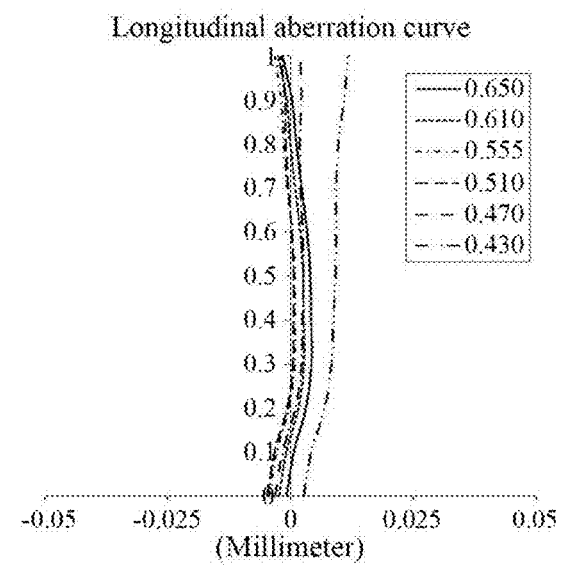
FIGS. 2A-2D respectively illustrate a longitudinal aberration curve, an astigmatic curve, a distortion curve and a lateral color curve of the optical imaging lens assembly of Example 1.
Figure 2B:
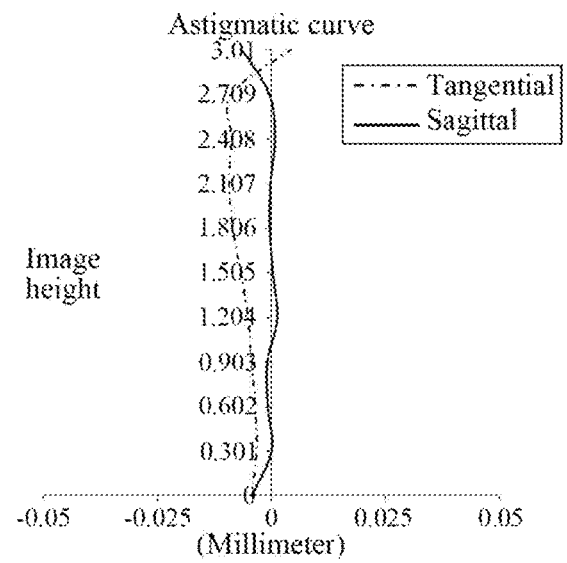
Figure 2C:
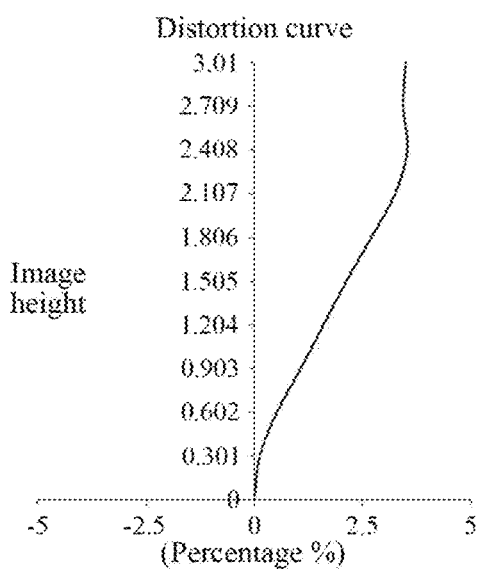
Figure 2D:
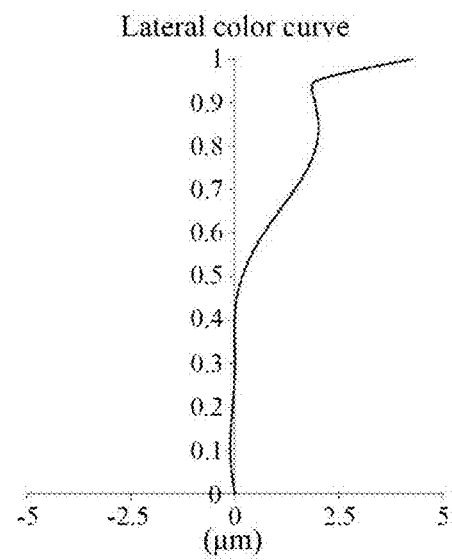
Figure 3A:
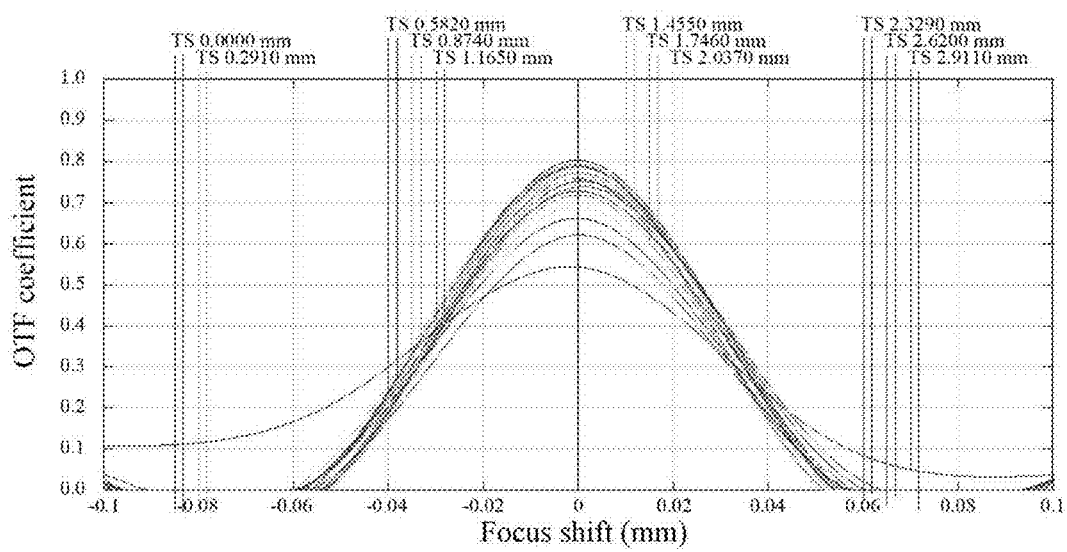
FIG. 3A and FIG. 3B respectively illustrate a focus shift curve diagram and a modulation transfer function (MTF) curve diagram of the optical imaging lens assembly of Example 1 within a waveband range of 430 nm to 650 nm, when a distance from an object to the optical imaging lens assembly is 350 mm.
Figure 3B:
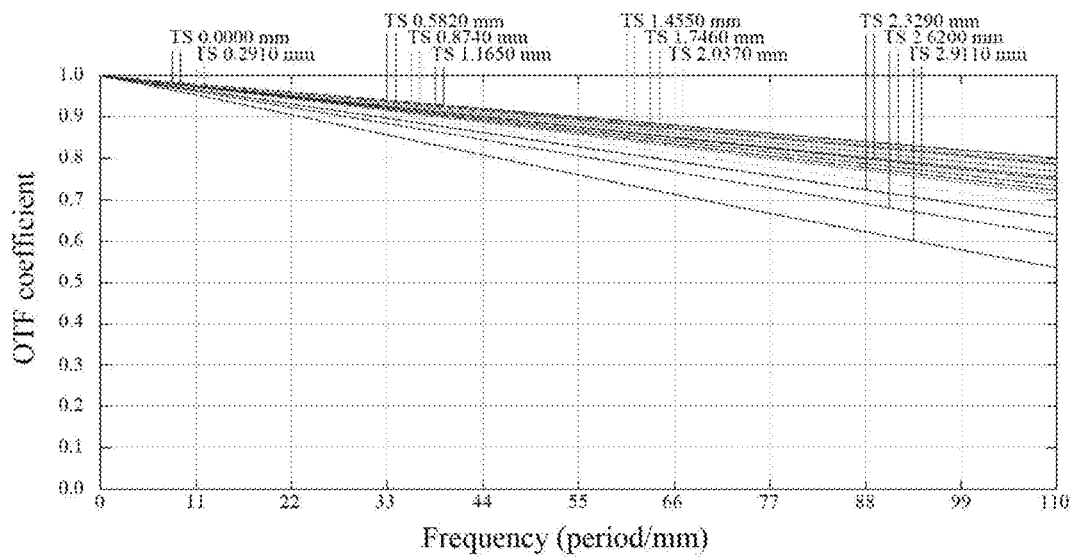
Figure 4A:
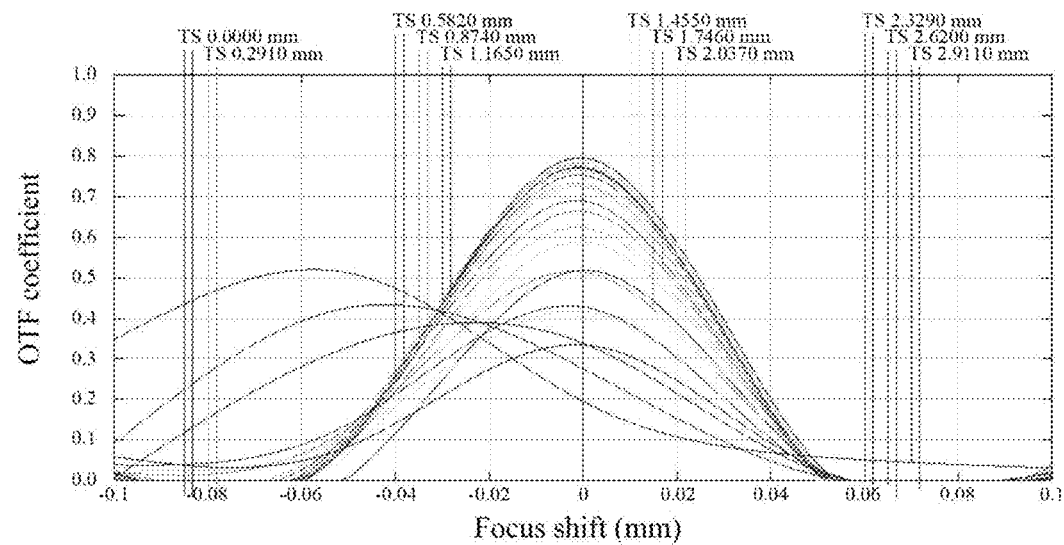
FIG. 4A and FIG. 4B respectively illustrate a focus shift curve diagram and an MTF curve diagram of the optical imaging lens assembly of Example 1 within a waveband range of 430 nm to 650 nm, when a distance from the object to the optical imaging lens assembly is 150 mm.
Figure 4B:
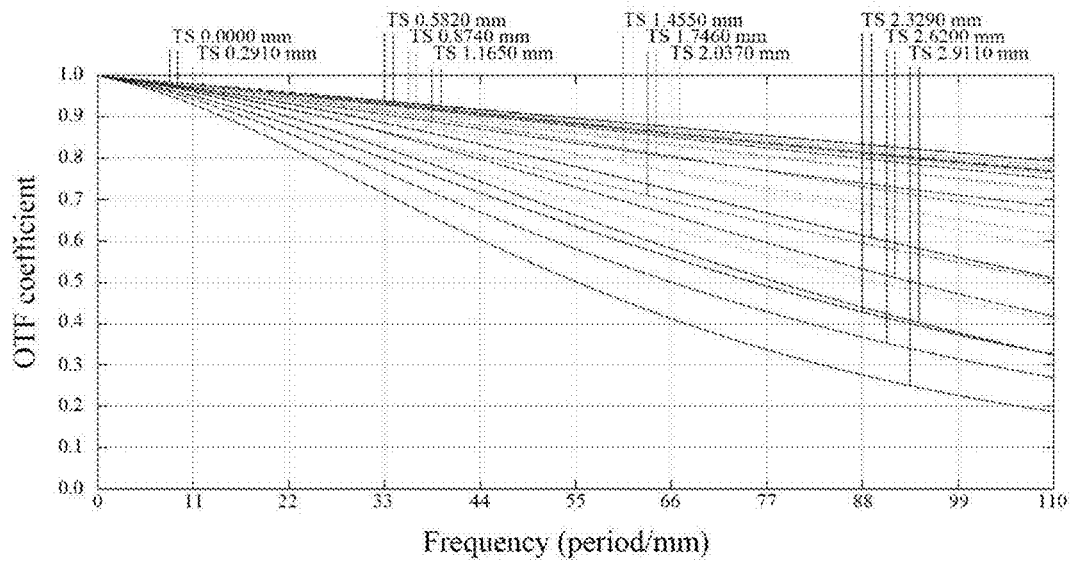
Figure 5A:
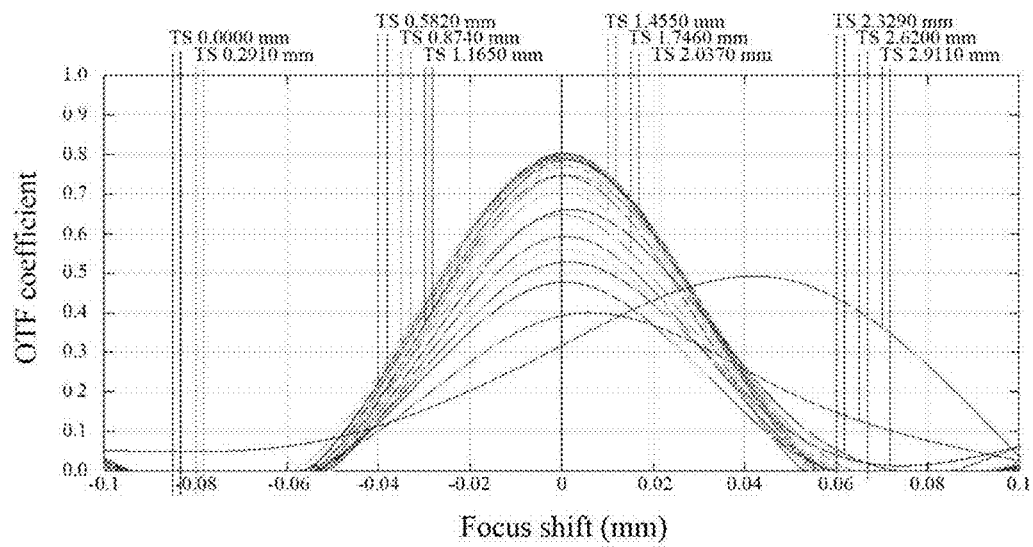
FIG. 5A and FIG. 5B respectively illustrate a focus shift curve diagram and an MTF curve diagram of the optical imaging lens assembly of Example 1 within a waveband range of 430 nm to 650 nm, when a distance from the object to the optical imaging lens assembly is infinite.
Figure 5B:
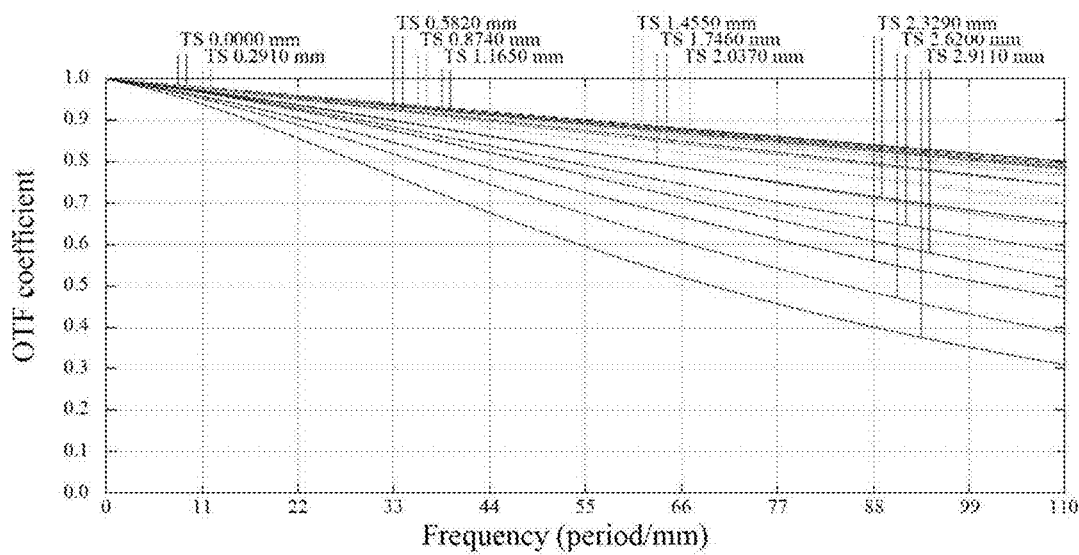

FIG. 2A illustrates the longitudinal aberration curve of the optical imaging lens assembly according to Example 1, representing deviations of focal points converged by light of different wavelengths after passing through the lens assembly. FIG. 2B illustrates the astigmatic curve of the optical imaging lens assembly according to Example 1, representing a curvature of a tangential plane and a curvature of a sagittal plane. FIG. 2C illustrates the distortion curve of the optical imaging lens assembly according to Example 1, representing the amounts of distortion corresponding to different image heights. FIG. 2D illustrates the lateral color curve of the optical imaging lens assembly according to Example 1, representing deviations of different image heights on an imaging plane after light passes through the lens assembly. FIG. 3A, FIG. 4A and FIG. 5A respectively illustrate focus shift curve diagrams of the optical imaging lens assembly of Example 1 within a waveband range of 430 nm to 650 nm, when the distances from the object to the optical imaging lens assembly are 350 mm, 150 mm and infinite, representing the pixel sizes in a tangential field-of-view and a sagittal field-of-view under different focal shifts (that is, a difference between the actual focal length and a theoretical focal length). FIG. 3B, FIG. 4B and FIG. 5B respectively illustrate MTF curve diagrams of the optical imaging lens assembly of Example 1 within a waveband range of 430 nm to 650 nm, when the distances from the object to the optical imaging lens assembly is 350 mm, 150 mm and infinite, representing the pixel sizes in a tangential field-of-view and a sagittal field-of-view at different frequencies. It can be seen from FIG. 2A to FIG. 5B that the optical imaging lens assembly provided in Example 1 can achieve a good imaging quality.

Example 2

Figure 6:
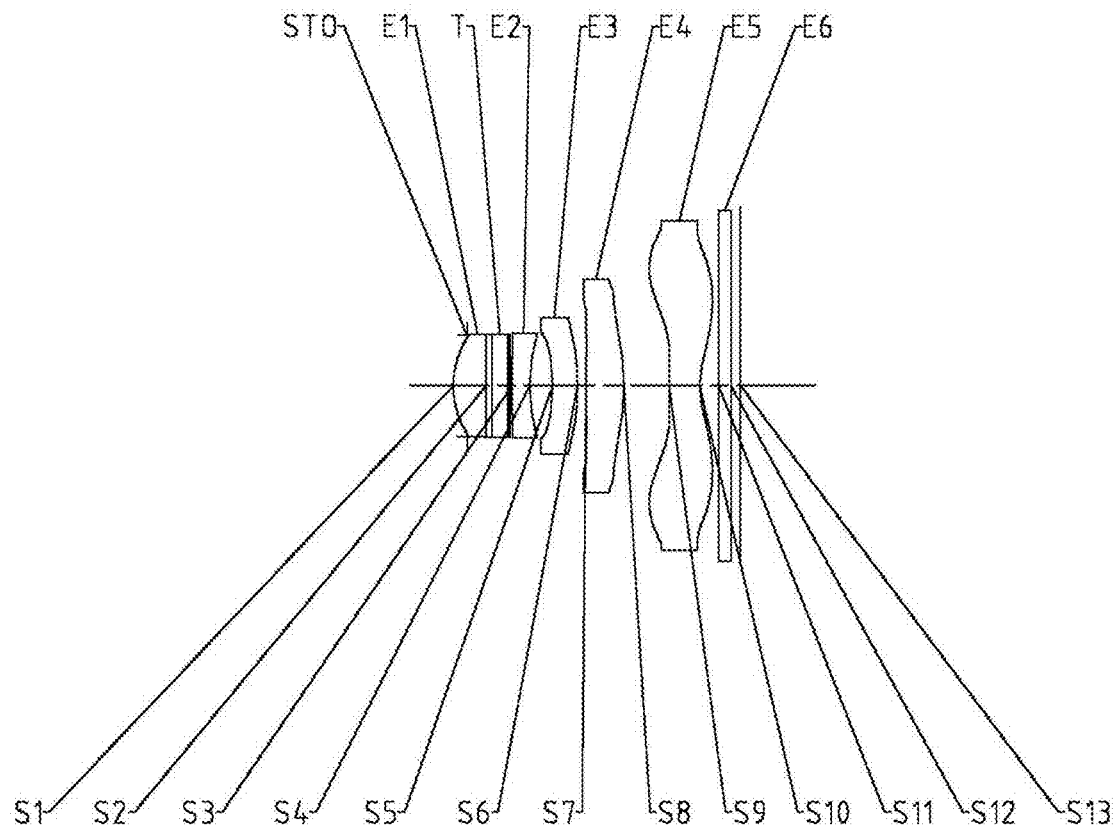
FIG. 6 is a schematic structural diagram illustrating an optical imaging lens assembly according to Example 2 of the present disclosure.

An optical imaging lens assembly according to Example 2 of the present disclosure is described below with reference to FIG. 6 to FIG. 10B. In this example and the following examples, for the purpose of brevity, the description of parts similar to those in Example 1 will be omitted. FIG. 6 illustrates a schematic structural diagram of the optical imaging lens assembly according to Example 2 of the present disclosure.

As shown in FIG. 6, the optical imaging lens assembly from an object side to an image side sequentially includes: a stop STO, a first lens E1, an autofocus component T (including a light-transmitting module, a liquid material and a flexible film), a second lens E2, a third lens E3, a fourth lens E4, a fifth lens E5, an optical filter E6 and an imaging plane S13.

The first lens E1 has a positive refractive power, an object-side surface S1 of the first lens is a convex surface, and an image-side surface S2 of the first lens is a flat surface. The second lens E2 has a negative refractive power, an object-side surface S3 of the second lens is a convex surface, and an image-side surface S4 of the second lens is a concave surface. The third lens E3 has a negative refractive power, an object-side surface S5 of the third lens is a concave surface, and an image-side surface S6 of the third lens is a convex surface. The fourth lens E4 has a positive refractive power, an object-side surface S7 of the fourth lens is a convex surface, and an image-side surface S8 of the fourth lens is a convex surface. The fifth lens E5 has a negative refractive power, an object-side surface S9 of the fifth lens is a convex surface, and an image-side surface S10 of the fifth lens is a concave surface. The optical filter E6 has an object-side surface S11 and an image-side surface S12. The first lens E1 and the light-transmitting module may be cemented together. Light from an object sequentially passes through the surfaces S1 to S12 and is finally imaged on the imaging plane S13.

In this example, the total effective focal length f of the optical imaging lens assembly is 4.03 mm, the total track length TTL of the optical imaging lens assembly is 4.85 mm, a half of a diagonal length ImgH of an effective pixel area on the imaging plane S13 of the optical imaging lens assembly is 3.01 mm, a half of a maximum field-of-view Semi-FOV of the optical imaging lens assembly is 35.3°, and an F number Fno of the optical imaging lens assembly is 2.47.

Table 3 is a table illustrating basic parameters of the optical imaging lens assembly of Example 2, where the units for the radius of curvature, the thickness/distance and the focal length are millimeter (mm). Table 4 shows high-order coefficients applicable to each aspheric surface in Example 2, where the surface shape of each aspheric surface may be defined by the formula (1) given in the above Example 1.

TABLE 3

| Surface number | Surface type | Radius of curvature | Thickness/ Distance | Material Refractive index | Abbe number | Focal length | Conic coefficient |
|---|---|---|---|---|---|---|---|
| OBJ | Spherical | infinite | D1 | | | | |
| STO | Spherical | infinite | −0.2399 | | | | |
| S1 | Aspheric | 1.5521 | 0.5579 | 1.55 | 56.1 | 2.83 | −0.5703 |
| S2 | Spherical | infinite | 0.0000 | | | | |
| | Spherical | infinite | 0.1000 | 1.52 | 64.2 | | |
| | Spherical | infinite | 0.2650 | 1.57 | 29.9 | | |
| | Spherical | RT | 0.0200 | 1.53 | 65.4 | | |
| | Spherical | | 0.0500 | | | | |
| S3 | Aspheric | 12.0882 | 0.3000 | 1.67 | 20.4 | −5.78 | −65.2806 |
| S4 | Aspheric | 2.8927 | 0.3846 | | | | −9.3972 |
| S5 | Aspheric | −4.6072 | 0.4200 | 1.67 | 20.4 | −13.77 | 12.9846 |
| S6 | Aspheric | −9.5913 | 0.1469 | | | | 0.6594 |
| S7 | Aspheric | 9.4779 | 0.6374 | 1.55 | 56.1 | 5.60 | −70.6866 |
| S8 | Aspheric | −4.4000 | 0.7628 | | | | 4.0702 |
| S9 | Aspheric | 4.5716 | 0.5159 | 1.54 | 55.8 | −3.96 | −5.5826 |
| S10 | Aspheric | 1.3948 | 0.3189 | | | | −5.3843 |
| S11 | Spherical | infinite | 0.2100 | 1.52 | 64.2 | | |
| S12 | Spherical | infinite | 0.1619 | | | | |
| S13 | Spherical | infinite | | | | | |

In this example, an object-side surface of the liquid material and an image-side surface the light-transmitting module may be cemented together. By changing the radius of curvature of a flexible film surface of the autofocus component T and the radius of curvature of an image-side surface of the liquid material of the autofocus component T, the total effective focal length of the optical imaging lens assembly may be changed with the change of a distance from the object to the optical imaging lens assembly, thereby realizing the autofocus function of the optical imaging lens assembly. Specifically, when the distance D1 between the optical imaging lens assembly and the object is 350 mm, the image-side surface of the autofocus component T is a convex surface, and the radius of curvature RT is −318.3000 mm. When the distance D1 between the optical imaging lens assembly and the object is 150 mm, the image-side surface of the autofocus component T is a convex surface, and the radius of curvature RT is −79.0500. When the distance D1 between the optical imaging lens assembly and the object is infinite, the image-side surface of the autofocus component T is a concave surface, and the radius of curvature RT is 246.3000.

Figure 7A:
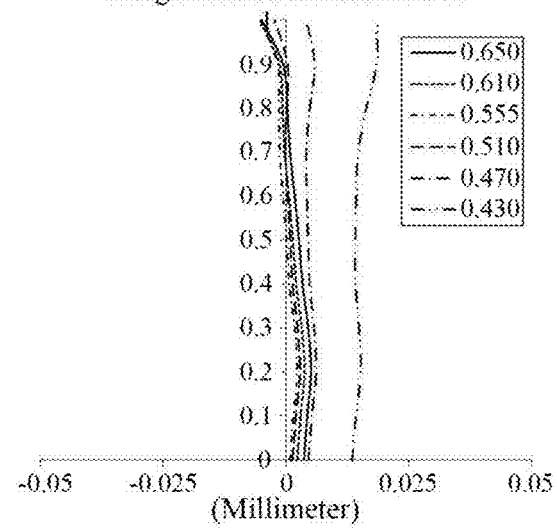
FIGS. 7A-7D respectively illustrate a longitudinal aberration curve, an astigmatic curve, a distortion curve and a lateral color curve of the optical imaging lens assembly of Example 2.
Figure 7B:
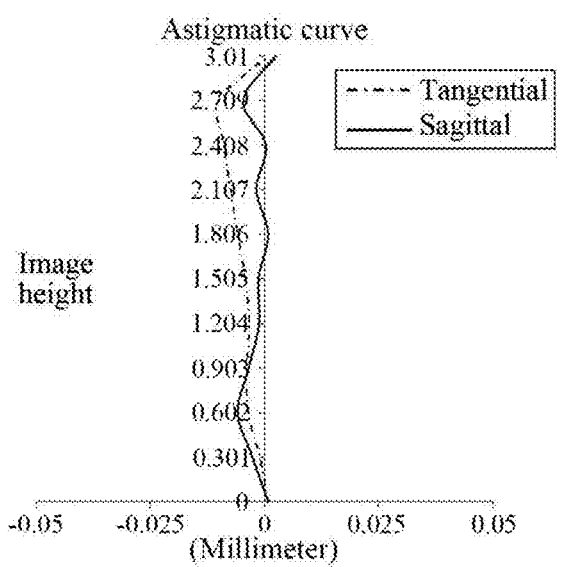
Figure 7C:
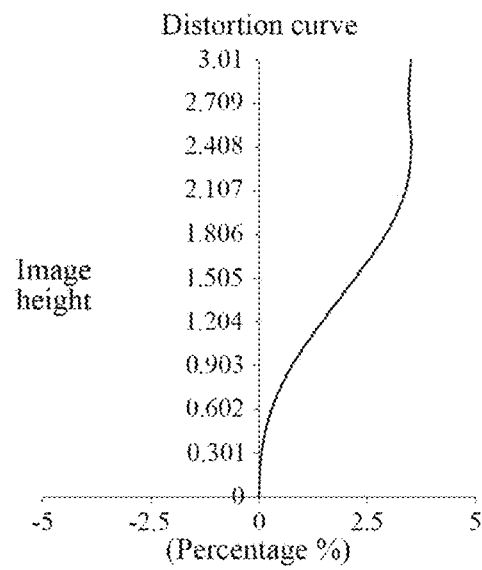
Figure 7D:
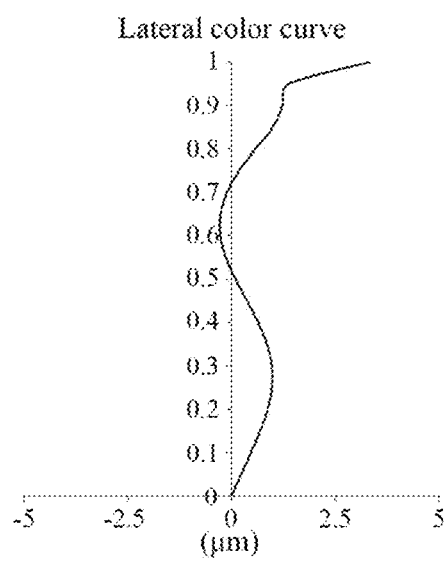
Figure 8A:
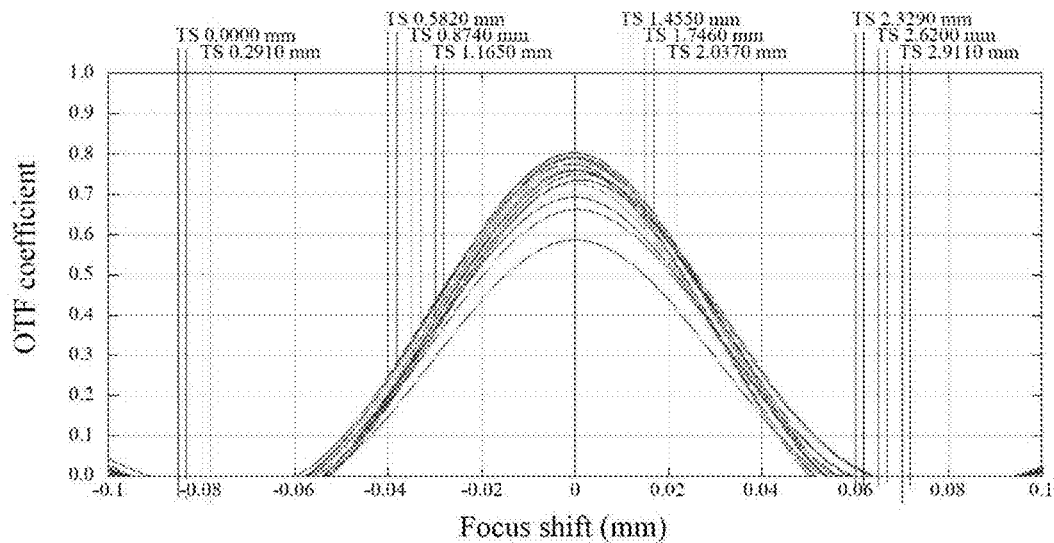
FIG. 8A and FIG. 8B respectively illustrate a focus shift curve diagram and an MTF curve diagram of the optical imaging lens assembly of Example 2 within a waveband range of 430 nm to 650 nm, when a distance from the object to the optical imaging lens assembly is 350 mm.
Figure 8B:
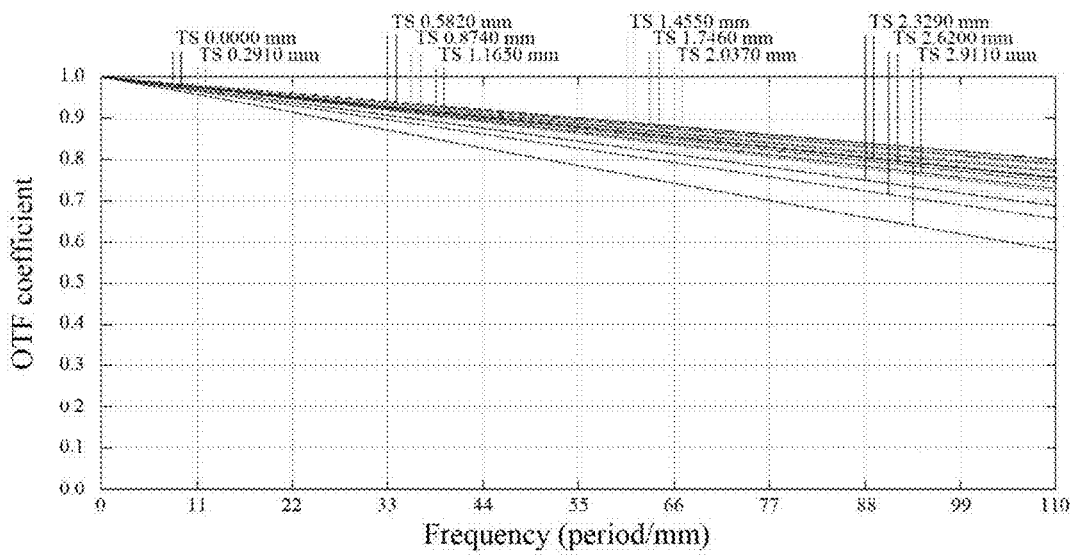
Figure 9A:
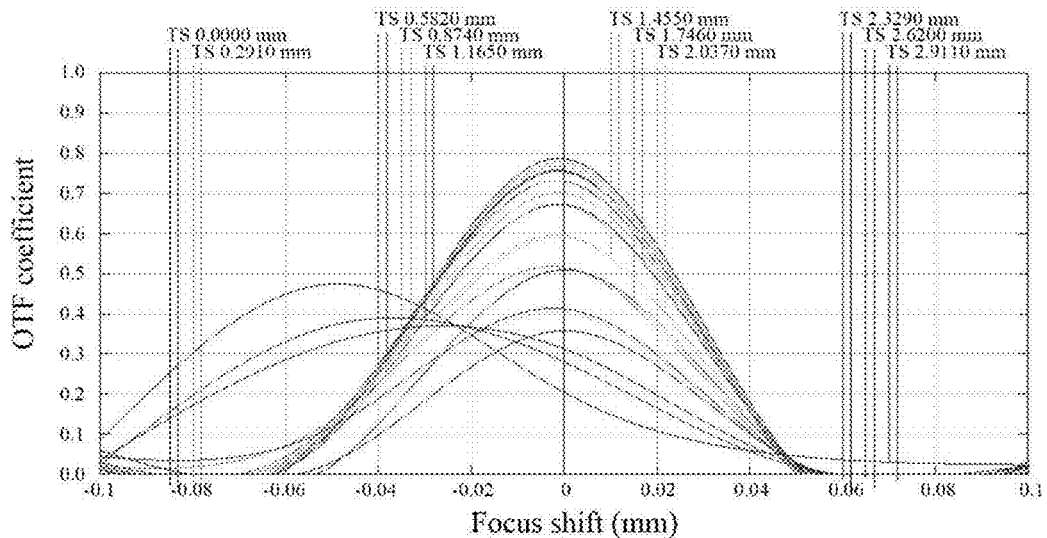
FIG. 9A and FIG. 9B respectively illustrate a focus shift curve diagram and an MTF curve diagram of the optical imaging lens assembly of Example 2 within a waveband range of 430 nm to 650 nm, when a distance from the object to the optical imaging lens assembly is 150 mm.
Figure 9B:
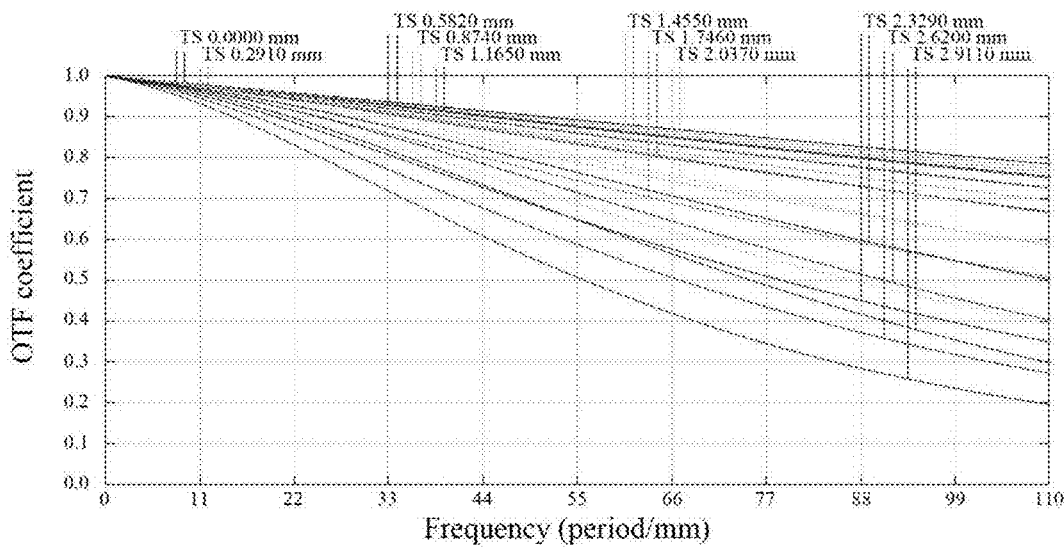
Figure 10A:
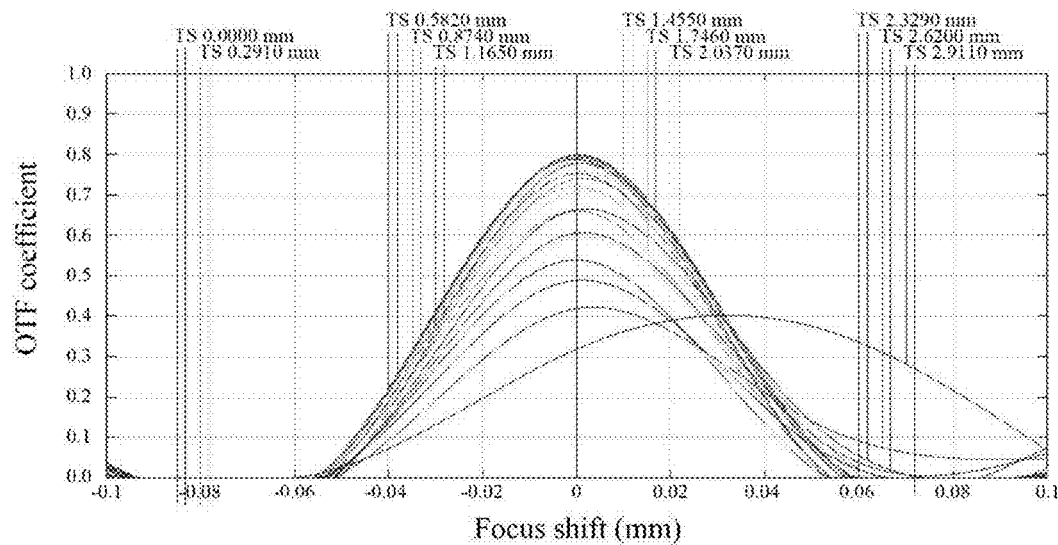
FIG. 10A and FIG. 10B respectively illustrate a focus shift curve diagram and an MTF curve diagram of the optical imaging lens assembly of Example 2 within a waveband range of 430 nm to 650 nm, when a distance from the object to the optical imaging lens assembly is infinite.
Figure 10B:
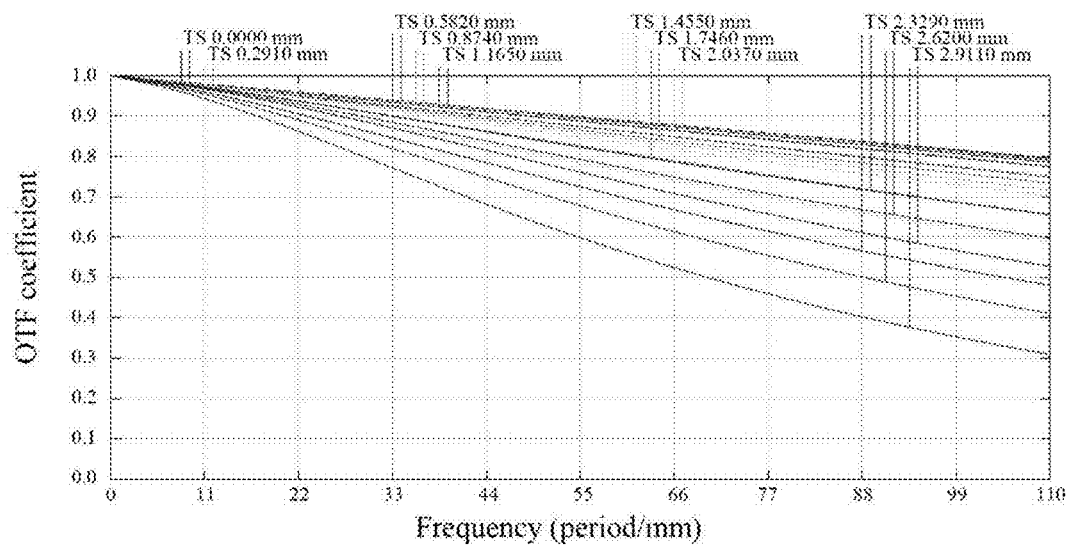

FIG. 7A illustrates the longitudinal aberration curve of the optical imaging lens assembly according to Example 2, representing deviations of focal points converged by light of different wavelengths after passing through the lens assembly. FIG. 7B illustrates the astigmatic curve of the optical imaging lens assembly according to Example 2, representing a curvature of a tangential plane and a curvature of a sagittal plane. FIG. 7C illustrates the distortion curve of the optical imaging lens assembly according to Example 2, representing the amounts of distortion corresponding to different image heights. FIG. 7D illustrates the lateral color curve of the optical imaging lens assembly according to Example 2, representing deviations of different image heights on an imaging plane after light passes through the lens assembly. FIG. 8A, FIG. 9A and FIG. 10A respectively illustrate focus shift curve diagrams of the optical imaging lens assembly of Example 2 within a waveband range of 430 nm to 650 nm, when the distances from the object to the optical imaging lens assembly are 350 mm, 150 mm and infinite, representing the pixel sizes in a tangential field-of-view and a sagittal field-of-view under different focal shifts. FIG. 8B, FIG. 9B and FIG. 10B respectively illustrate MTF curve diagrams of the optical imaging lens assembly of Example 2 within a waveband range of 430 nm to 650 nm, when the distances from the object to the optical imaging lens assembly are 350 mm, 150 mm and infinite, representing the pixel sizes in a tangential field-of-view and a sagittal field-of-view at different frequencies. It can be seen from FIG. 7A to FIG. 10B that the optical imaging lens assembly provided in Example 2 can achieve a good imaging quality.

TABLE 4

| Surface number | A4 | A6 | A8 | A10 | A12 | A14 | A16 | A18 | A20 |
|---|---|---|---|---|---|---|---|---|---|
| S1 | 1.4460E−02 | 7.7893E−04 | 2.5036E−05 | 1.4824E−05 | −3.5072E−06 | 4.2279E−06 | −1.5615E−07 | 1.7546E−06 | −4.1342E−07 |
| S3 | −1.9127E−02 | 1.5021E−03 | 9.5844E−06 | 5.2363E−05 | 1.1496E−05 | 9.1231E−06 | 2.2111E−08 | −1.6914E−06 | −9.9849E−07 |
| S4 | 3.2641E−03 | 7.3457E−04 | −5.1172E−05 | 8.0821E−06 | −1.2509E−05 | 1.4413E−06 | −1.0585E−06 | 1.3813E−06 | −4.3715E−07 |
| S5 | −6.6579E−02 | −1.8249E−03 | −1.5047E−03 | −5.8009E−04 | −2.3528E−04 | −9.7435E−05 | −2.9663E−05 | −9.1246E−06 | −8.1496E−07 |
| S6 | −1.1329E−01 | 2.7413E−02 | −1.0329E−03 | 2.5806E−04 | 2.1811E−05 | −2.4705E−05 | 1.2406E−05 | 1.3592E−05 | −1.8398E−06 |
| S7 | −1.2083E−01 | 2.3683E−02 | −1.6021E−02 | −3.4976E−05 | −8.6021E−05 | −3.5082E−04 | 1.0917E−04 | 0.0000E+00 | 0.0000E+00 |
| S8 | 2.8695E−01 | 2.0064E−02 | −2.6469E−02 | 1.1882E−03 | 2.0530E−03 | −5.5733E−04 | 0.0000E+00 | 0.0000E+00 | 0.0000E+00 |
| S9 | −1.2019E+00 | 6.4267E−01 | −2.4778E−01 | 7.8606E−02 | −1.7749E−02 | 2.7030E−03 | −1.4413E−03 | 1.0161E−03 | −4.3268E−04 |
| S10 | −1.3675E+00 | 3.1040E−01 | −4.8909E−02 | 4.5110E−02 | −1.4649E−02 | 3.3107E−03 | −2.7937E−03 | 3.8239E−04 | −5.5011E−04 |

Example 3

Figure 11:
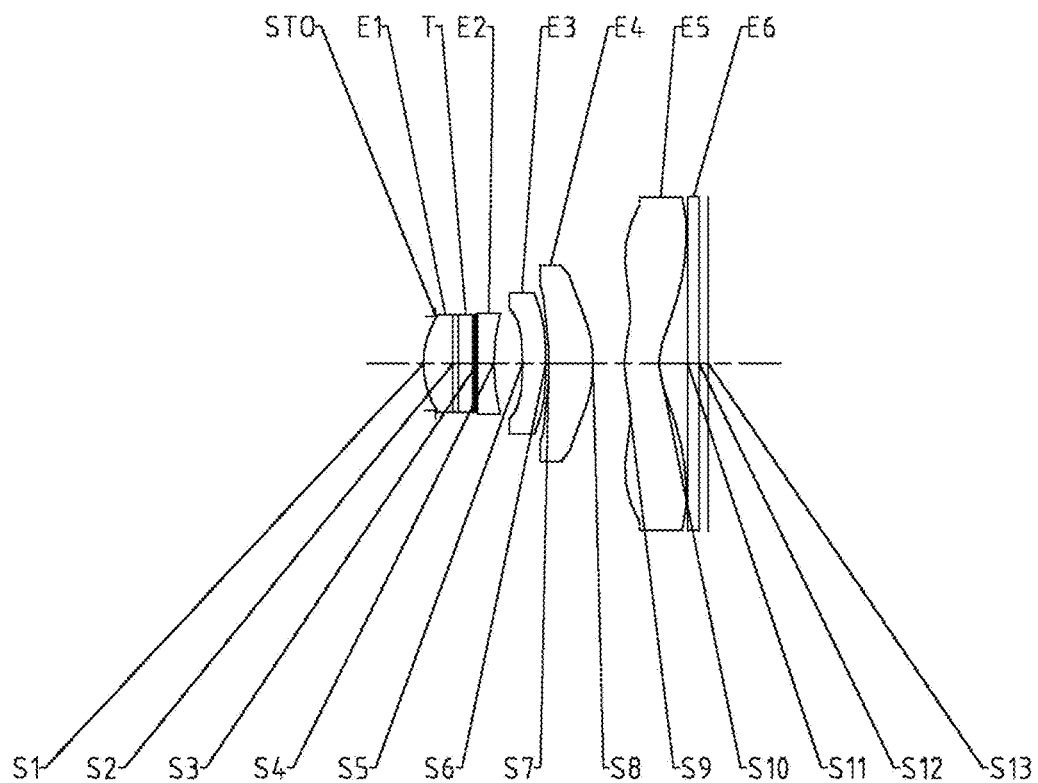
FIG. 11 is a schematic structural diagram illustrating an optical imaging lens assembly according to Example 3 of the present disclosure.

An optical imaging lens assembly according to Example 3 of the present disclosure is described below with reference to FIG. 11 to FIG. 15B. FIG. 11 illustrates a schematic structural diagram of the optical imaging lens assembly according to Example 3 of the present disclosure.

As shown in FIG. 11, the optical imaging lens assembly from an object side to an image side sequentially includes: a stop STO, a first lens E1, an autofocus component T (including a light-transmitting module, a liquid material and a flexible film), a second lens E2, a third lens E3, a fourth lens E4, a fifth lens E5, an optical filter E6 and an imaging plane S13.

The first lens E1 has a positive refractive power, an object-side surface S1 of the first lens is a convex surface, and an image-side surface S2 of the first lens is a flat surface. The second lens E2 has a negative refractive power, an object-side surface S3 of the second lens is a convex surface, and an image-side surface S4 of the second lens is a concave surface. The third lens E3 has a negative refractive power, an object-side surface S5 of the third lens is a concave surface, and an image-side surface S6 of the third lens is a convex surface. The fourth lens E4 has a positive refractive power, an object-side surface S7 of the fourth lens is a concave surface, and an image-side surface S8 of the fourth lens is a convex surface. The fifth lens E5 has a negative refractive power, an object-side surface S9 of the fifth lens is a convex surface, and an image-side surface S10 of the fifth lens is a concave surface. The optical filter E6 has an object-side surface S11 and an image-side surface S12. The first lens E1 and the light-transmitting module may be cemented together. Light from an object sequentially passes through the surfaces S1 to S12 and is finally imaged on the imaging plane S13.

In this example, the total effective focal length f of the optical imaging lens assembly is 4.00 mm, the total track length TTL of the optical imaging lens assembly is 5.17 mm, a half of a diagonal length ImgH of an effective pixel area on the imaging plane S13 of the optical imaging lens assembly is 3.01 mm, a half of a maximum field-of-view Semi-FOV of the optical imaging lens assembly is 36.2°, and an F number Fno of the optical imaging lens assembly is 2.47.

Table 5 is a table illustrating basic parameters of the optical imaging lens assembly of Example 3, where the units for the radius of curvature, the thickness/distance and the focal length are millimeter (mm). Table 6 shows high-order coefficients applicable to each aspheric surface in Example 3, where the surface shape of each aspheric surface may be defined by the formula (1) given in the above Example 1.

TABLE 5

| Surface number | Surface type | Radius of curvature | Thickness/ Distance | Refractive index | Abbe number | Focal length | Conic coefficient |
|---|---|---|---|---|---|---|---|
| OBJ | Spherical | infinite | D1 | | | | |
| STO | Spherical | infinite | −0.2181 | | | | |
| S1 | Aspheric | 1.6446 | 0.5361 | 1.55 | 56.1 | 3.00 | −0.6306 |
| S2 | Spherical | infinite | 0.0000 | | | | |
| | Spherical | infinite | 0.1000 | 1.52 | 64.2 | | |
| | Spherical | infinite | 0.2650 | 1.57 | 29.9 | | |
| | Spherical | RT | 0.0200 | 1.53 | 65.4 | | |
| | Spherical | | 0.0578 | | | | |
| S3 | Aspheric | 25.0000 | 0.3000 | 1.67 | 20.4 | −6.38 | −18.4073 |
| S4 | Aspheric | 3.6176 | 0.5216 | | | | −8.4728 |
| S5 | Aspheric | −7.2998 | 0.4200 | 1.67 | 20.4 | −26.92 | 48.4116 |
| S6 | Aspheric | −12.5923 | 0.0578 | | | | 82.3167 |
| S7 | Aspheric | −6.7000 | 0.8000 | 1.55 | 56.1 | 10.57 | −90.0000 |
| S8 | Aspheric | −3.2312 | 0.5674 | | | | 2.0922 |
| S9 | Aspheric | 1.4566 | 0.6253 | 1.54 | 55.8 | −10.25 | −5.2368 |
| S10 | Aspheric | 0.9790 | 0.5299 | | | | −3.7057 |
| S11 | Spherical | infinite | 0.2100 | 1.52 | 64.2 | | |
| S12 | Spherical | infinite | 0.1624 | | | | |
| S13 | Spherical | infinite | | | | | |

In this example, an object-side surface of the liquid material and an image-side surface the light-transmitting module may be cemented together. By changing the radius of curvature of a flexible film surface of the autofocus component T and the radius of curvature of an image-side surface of the liquid material of the autofocus component T, the total effective focal length of the optical imaging lens assembly may be changed with the change of a distance from the object to the optical imaging lens assembly, thereby realizing the autofocus function of the optical imaging lens assembly. Specifically, when the distance D1 between the optical imaging lens assembly and the object is 350 mm, the image-side surface of the autofocus component T is a convex surface, and the radius of curvature RT is −247.0000 mm. When the distance D1 between the optical imaging lens assembly and the object is 150 mm, the image-side surface of the autofocus component T is a convex surface, and the radius of curvature RT is −75.0600. When the distance D1 between the optical imaging lens assembly and the object is infinite, the image-side surface of the autofocus component T is a concave surface, and the radius of curvature RT is 336.5000.

TABLE 6

| Surface number | A4 | A6 | A8 | A10 | A12 | A14 | A16 | A18 | A20 |
|---|---|---|---|---|---|---|---|---|---|
| S1 | 1.5017E−02 | 6.6713E−04 | 1.1481E−05 | −7.0422E−06 | −1.4617E−05 | −7.1814E−06 | −7.1174E−06 | −2.6545E−06 | −1.6316E−06 |
| S3 | −2.0056E−02 | 6.6575E−03 | 8.9926E−04 | 9.7127E−05 | −1.2004E−04 | −7.2407E−05 | 5.3895E−06 | 2.0828E−05 | 8.7698E−06 |

TABLE 6-continued

| Surface number | A4 | A6 | A8 | A10 | A12 | A14 | A16 | A18 | A20 |
|---|---|---|---|---|---|---|---|---|---|
| S4 | 9.4277E−03 | 4.1056E−03 | 7.7226E−04 | 1.7740E−04 | 2.0504E−05 | −2.3223E−05 | −2.2898E−05 | −1.2934E−05 | −4.3278E−06 |
| S5 | −1.2538E−01 | −5.3950E−03 | 1.9065E−03 | 3.9471E−04 | 1.2961E−04 | 3.0916E−05 | 4.1466E−05 | 1.8137E−05 | 9.1239E−06 |
| S6 | −1.3481E−01 | 1.6830E−02 | 3.9040E−03 | 1.6715E−03 | 1.6766E−05 | −2.0787E−04 | −3.1564E−06 | 2.9621E−05 | 9.0607E−06 |
| S7 | −4.6518E−02 | 1.8713E−02 | −1.3465E−02 | 2.5287E−03 | −6.9969E−04 | −2.0924E−04 | −1.8147E−05 | 3.4084E−05 | −3.5490E−05 |
| S8 | 2.2605E−01 | 1.0608E−01 | −6.9467E−02 | 1.4060E−02 | −4.1373E−03 | −7.0668E−04 | −1.1374E−03 | 4.5583E−04 | −3.5869E−04 |
| S9 | −1.2230E+00 | 5.4722E−01 | −1.9277E−01 | 6.1167E−02 | −1.8713E−02 | 6.4967E−03 | −2.7150E−03 | 9.2235E−04 | −1.5016E−04 |
| S10 | −9.9490E−01 | 2.2396E−01 | −7.3309E−02 | 3.0153E−02 | −1.0405E−02 | 3.2301E−03 | −9.9380E−04 | 2.5415E−04 | −4.6461E−05 |

Figure 12A:
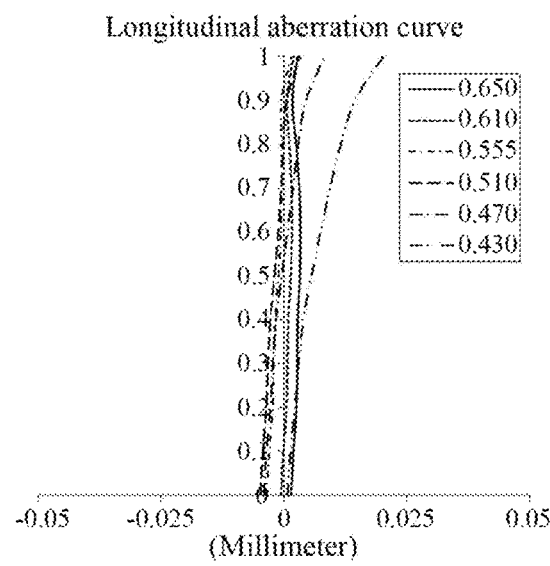
FIGS. 12A-12D respectively illustrate a longitudinal aberration curve, an astigmatic curve, a distortion curve and a lateral color curve of the optical imaging lens assembly of Example 3.
Figure 12B:
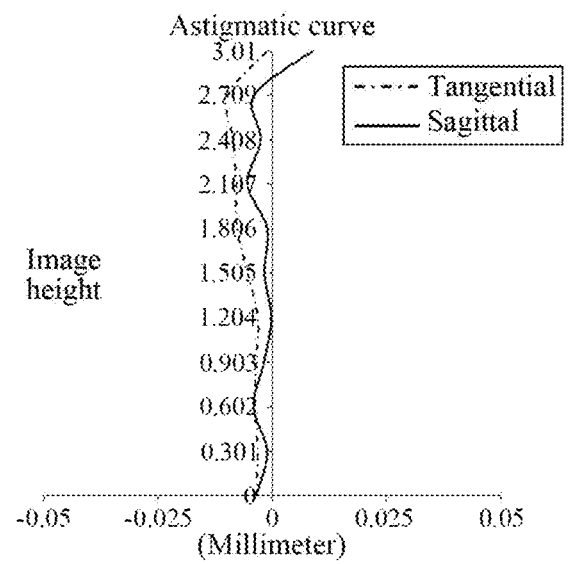
Figure 12C:
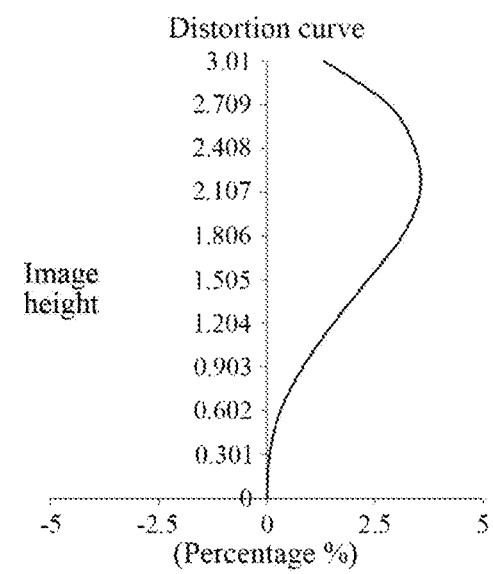
Figure 12D:
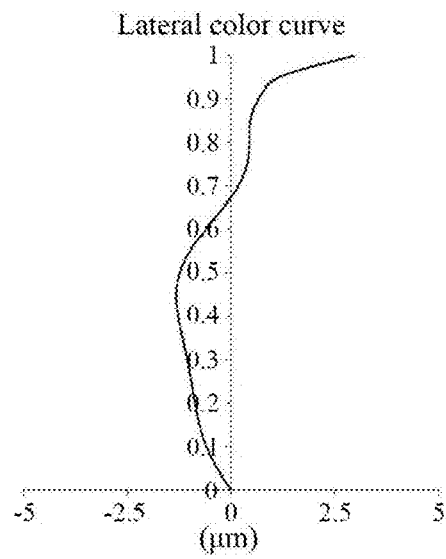
Figure 13A:
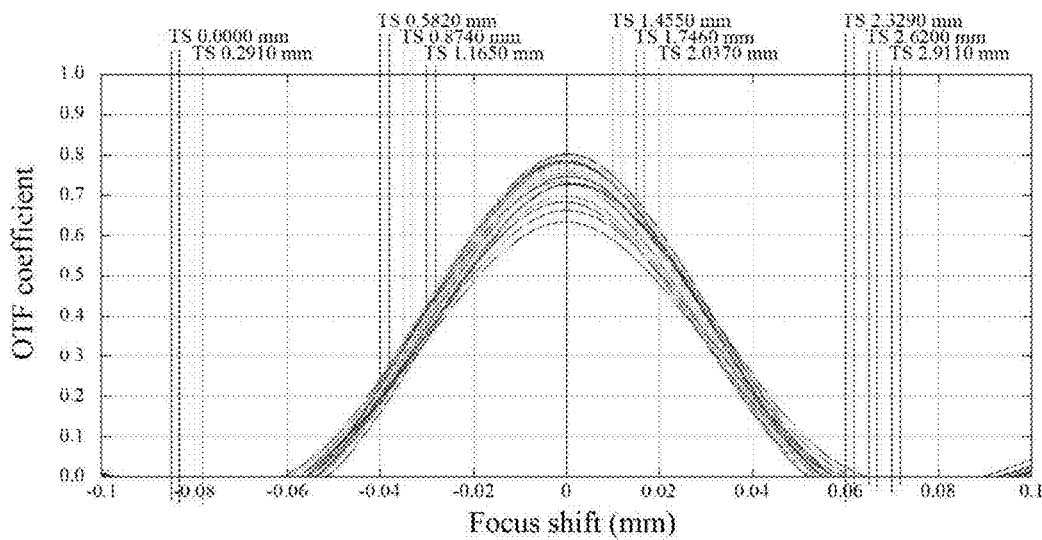
FIG. 13A and FIG. 13B respectively illustrate a focus shift curve diagram and an MTF curve diagram of the optical imaging lens assembly of Example 3 within a waveband range of 430 nm to 650 nm, when a distance from the object to the optical imaging lens assembly is 350 mm.
Figure 13B:
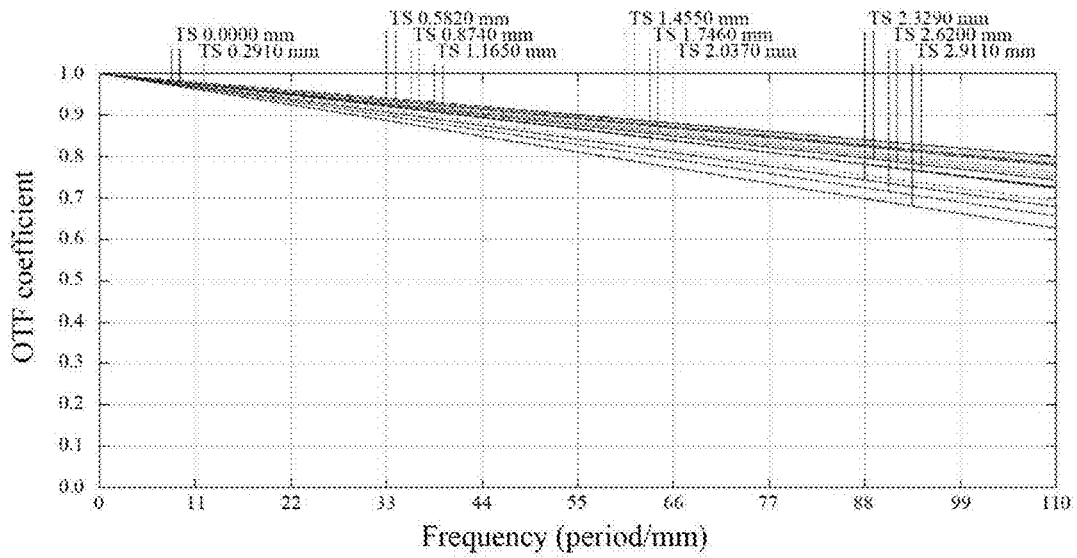
Figure 14A:
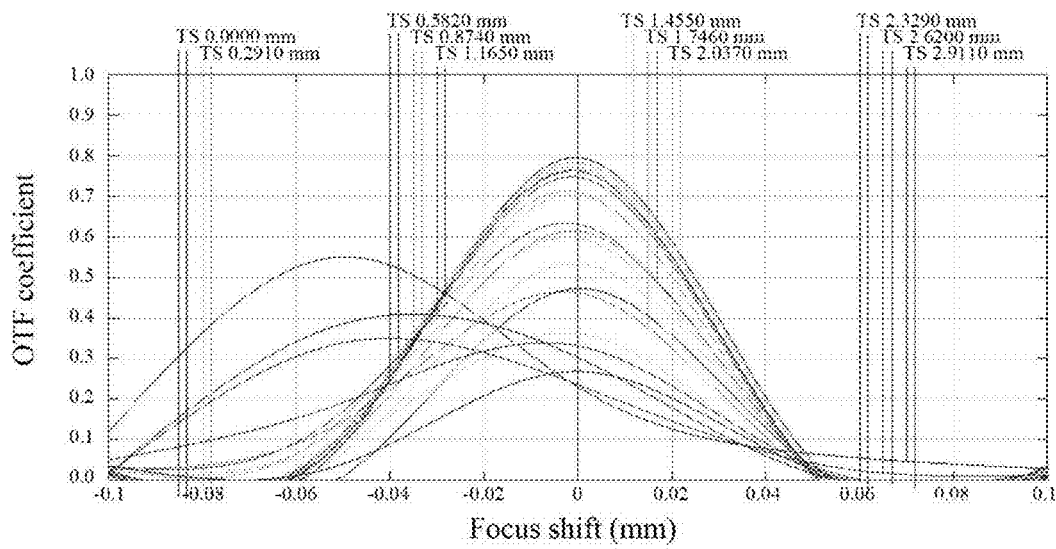
FIG. 14A and FIG. 14B respectively illustrate a focus shift curve diagram and an MTF curve diagram of the optical imaging lens assembly of Example 3 within a waveband range of 430 nm to 650 nm, when a distance from the object to the optical imaging lens assembly is 150 mm.
Figure 14B:
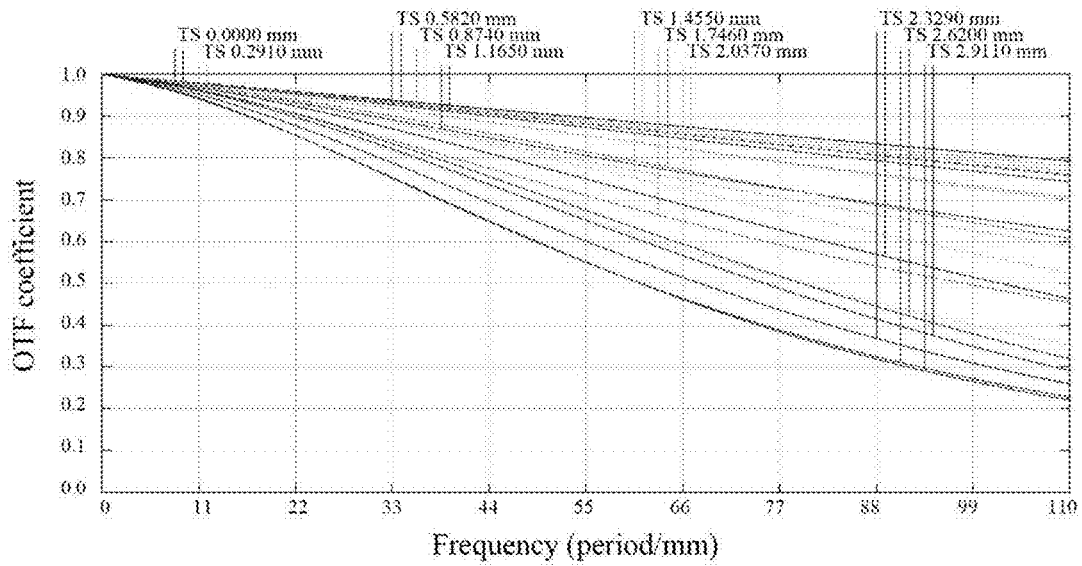
Figure 15A:
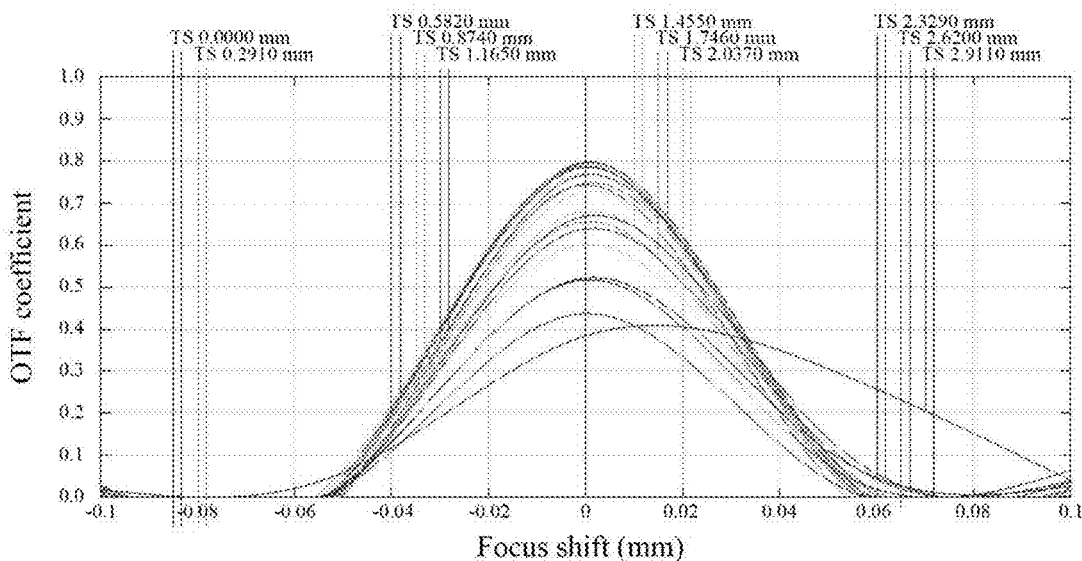
FIG. 15A and FIG. 15B respectively illustrate a focus shift curve diagram and an MTF curve diagram of the optical imaging lens assembly of Example 3 within a waveband range of 430 nm to 650 nm, when a distance from the object to the optical imaging lens assembly is infinite.
Figure 15B:
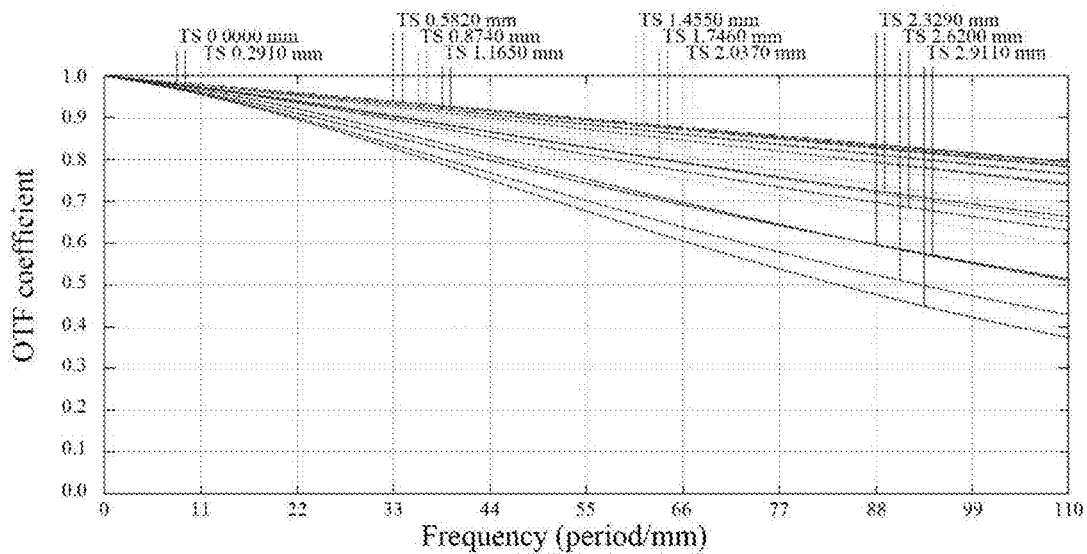

FIG. 12A illustrates the longitudinal aberration curve of the optical imaging lens assembly according to Example 3, representing deviations of focal points converged by light of different wavelengths after passing through the lens assembly. FIG. 12B illustrates the astigmatic curve of the optical imaging lens assembly according to Example 3, representing a curvature of a tangential plane and a curvature of a sagittal plane. FIG. 12C illustrates the distortion curve of the optical imaging lens assembly according to Example 3, representing the amounts of distortion corresponding to different image heights. FIG. 12D illustrates the lateral color curve of the optical imaging lens assembly according to Example 3, representing deviations of different image heights on an imaging plane after light passes through the lens assembly. FIG. 13A, FIG. 14A and FIG. 15A respectively illustrate focus shift curve diagrams of the optical imaging lens assembly of Example 3 within a waveband range of 430 nm to 650 nm, when the distances from the object to the optical imaging lens assembly are 350 mm, 150 mm and infinite, representing the pixel sizes in a tangential field-of-view and a sagittal field-of-view under different focal shifts. FIG. 13B, FIG. 14B and FIG. 15B respectively illustrate MTF curve diagrams of the optical imaging lens assembly of Example 3 within a waveband range of 430 nm to 650 nm, when the distances from the object to the optical imaging lens assembly are 350 mm, 150 mm and infinite, representing the pixel sizes in a tangential field-of-view and a sagittal field-of-view at different frequencies. It can be seen from FIG. 12A to FIG. 15B that the optical imaging lens assembly provided in Example 3 can achieve a good imaging quality.

Example 4

Figure 16:
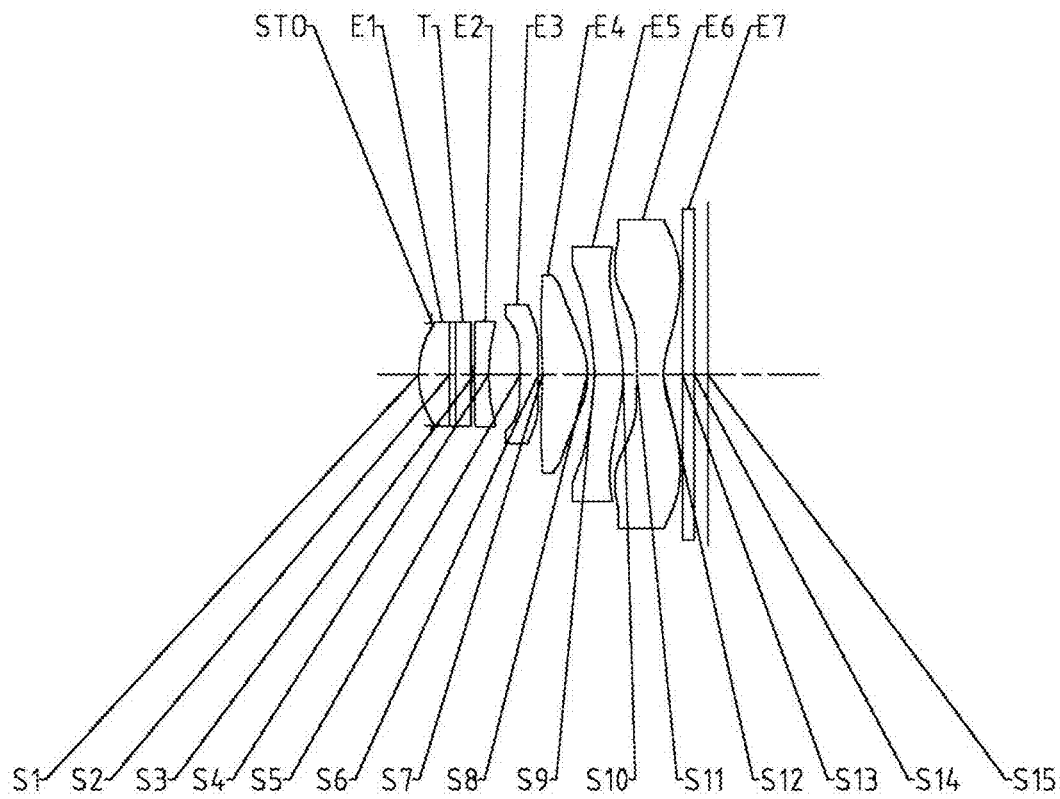
FIG. 16 is a schematic structural diagram illustrating an optical imaging lens assembly according to Example 4 of the present disclosure.

An optical imaging lens assembly according to Example 4 of the present disclosure is described below with reference to FIG. 16 to FIG. 20B. FIG. 16 illustrates a schematic structural diagram of the optical imaging lens assembly according to Example 4 of the present disclosure.

As shown in FIG. 16, the optical imaging lens assembly from an object side to an image side sequentially includes: a stop STO, a first lens E1, an autofocus component T (including a light-transmitting module, a liquid material and a flexible film), a second lens E2, a third lens E3, a fourth lens E4, a fifth lens E5, a sixth lens E6, an optical filter E7 and an imaging plane S15.

The first lens E1 has a positive refractive power, an object-side surface S1 of the first lens is a convex surface, and an image-side surface S2 of the first lens is a flat surface. The second lens E2 has a negative refractive power, an object-side surface S3 of the second lens is a convex surface, and an image-side surface S4 of the second lens is a concave surface. The third lens E3 has a negative refractive power, an object-side surface S5 of the third lens is a concave surface, and an image-side surface S6 of the third lens is a convex surface. The fourth lens E4 has a positive refractive power, an object-side surface S7 of the fourth lens is a concave surface, and an image-side surface S8 of the fourth lens is a convex surface. The fifth lens E5 has a positive refractive power, an object-side surface S9 of the fifth lens is a concave surface, and an image-side surface S10 of the fifth lens is a convex surface. The sixth lens E6 has a negative refractive power, an object-side surface S11 of the sixth lens is a convex surface, and an image-side surface S12 of the sixth lens is a concave surface. The optical filter E7 has an object-side surface S13 and an image-side surface S14. The first lens E1 and the light-transmitting module may be cemented together. Light from an object sequentially passes through the surfaces S1 to S14 and is finally imaged on the imaging plane S15.

In this example, the total effective focal length f of the optical imaging lens assembly is 3.90 mm, the total track length TTL of the optical imaging lens assembly is 5.08 mm, a half of a diagonal length ImgH of an effective pixel area on the imaging plane S15 of the optical imaging lens assembly is 3.01 mm, a half of a maximum field-of-view Semi-FOV of the optical imaging lens assembly is 36.2°, and an F number Fno of the optical imaging lens assembly is 2.25.

Table 7 is a table illustrating basic parameters of the optical imaging lens assembly of Example 4, where the units for the radius of curvature, the thickness/distance and the focal length are millimeter (mm). Table 8 shows high-order coefficients applicable to each aspheric surface in Example 4, where the surface shape of each aspheric surface may be defined by the formula (1) given in the above Example 1.

TABLE 7

| Surface number | Surface type | Radius of curvature | Thickness/ Distance | Material Refractive index | Material Abbe number | Focal length | Conic coefficient |
|---|---|---|---|---|---|---|---|
| OBJ | Spherical | infinite | D1 | | | | |
| STO | Spherical | infinite | −0.2275 | | | | |
| S1 | Aspheric | 1.6551 | 0.5455 | 1.55 | 56.1 | 3.02 | −0.6428 |
| S2 | Spherical | infinite | 0.0000 | | | | |

TABLE 7-continued

| Surface number | Surface type | Radius of curvature | Thickness/ Distance | Material Refractive index | Abbe number | Focal length | Conic coefficient |
|---|---|---|---|---|---|---|---|
|  | Spherical | infinite | 0.1000 | 1.52 | 64.2 |  |  |
|  | Spherical | infinite | 0.2650 | 1.57 | 29.9 |  |  |
|  | Spherical | RT | 0.0200 | 1.53 | 65.4 |  |  |
|  | Spherical |  | 0.0500 |  |  |  |  |
| S3 | Aspheric | 17.0120 | 0.2500 | 1.67 | 20.4 | −6.51 | −90.0000 |
| S4 | Aspheric | 3.4357 | 0.5512 |  |  |  | −10.5851 |
| S5 | Aspheric | −2.3042 | 0.3228 | 1.67 | 20.4 | −13.09 | 0.0136 |
| S6 | Aspheric | −4.1730 | 0.0765 |  |  |  | 0.5414 |
| S7 | Aspheric | −28.4570 | 0.7871 | 1.55 | 56.1 | 2.99 | 90.0000 |
| S8 | Aspheric | −1.5594 | 0.1259 |  |  |  | −4.4262 |
| S9 | Aspheric | −2.4625 | 0.4977 | 1.55 | 56.1 | 34.06 | −25.6254 |
| S10 | Aspheric | −2.3297 | 0.2400 |  |  |  | −22.9622 |
| S11 | Aspheric | 7.4494 | 0.4608 | 1.54 | 55.8 | −2.56 | 5.2532 |
| S12 | Aspheric | 1.1336 | 0.3428 |  |  |  | −5.3920 |
| S13 | Spherical | infinite | 0.2100 | 1.52 | 64.2 |  |  |
| S14 | Spherical | infinite | 0.2347 |  |  |  |  |
| S15 | Spherical | infinite |  |  |  |  |  |

In this example, an object-side surface of the liquid material and an image-side surface the light-transmitting module may be cemented together. By changing the radius of curvature of a flexible film surface of the autofocus component T and the radius of curvature of an image-side surface of the liquid material of the autofocus component T, the total effective focal length of the optical imaging lens assembly may be changed with the change of a distance from the object to the optical imaging lens assembly, thereby realizing the autofocus function of the optical imaging lens assembly. Specifically, when the distance D1 between the optical imaging lens assembly and the object is 350 mm, the image-side surface of the autofocus component T is a convex surface, and the radius of curvature RT is −267.7300 mm. When the distance D1 between the optical imaging lens assembly and the object is 150 mm, the image-side surface of the autofocus component T is a convex surface, and the radius of curvature RT is −78.0000. When the distance D1 between the optical imaging lens assembly and the object is infinite, the image-side surface of the autofocus component T is a concave surface, and the radius of curvature RT is 315.0000.

Figure 17A:
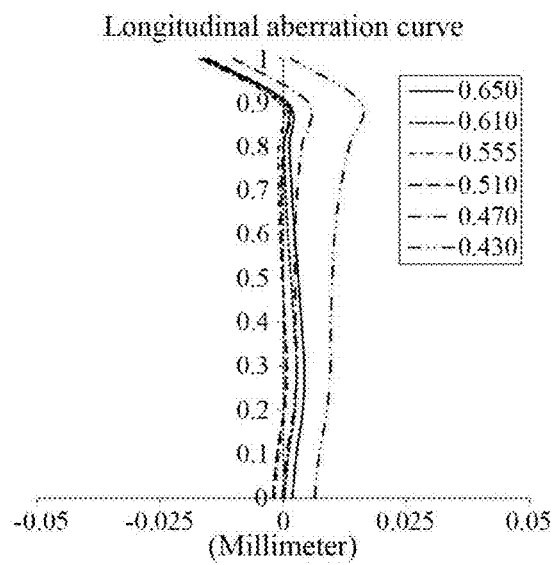
FIGS. 17A-17D respectively illustrate a longitudinal aberration curve, an astigmatic curve, a distortion curve and a lateral color curve of the optical imaging lens assembly of Example 4.
Figure 17B:
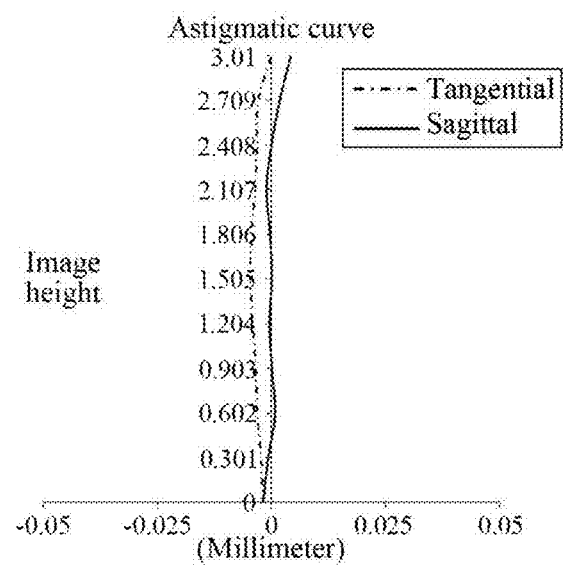
Figure 17C:
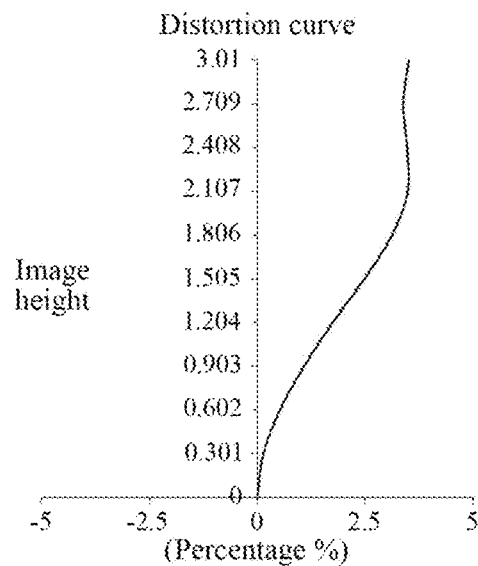
Figure 17D:
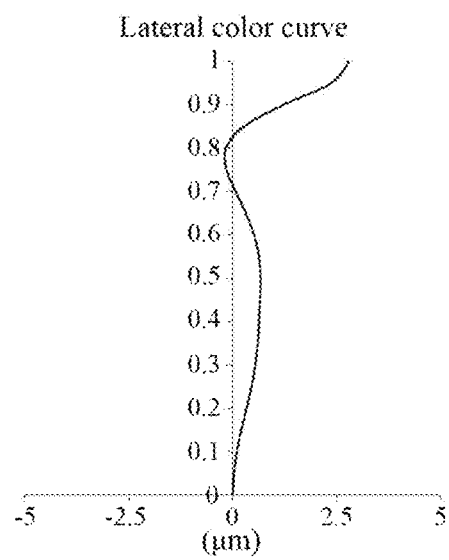
Figure 18A:
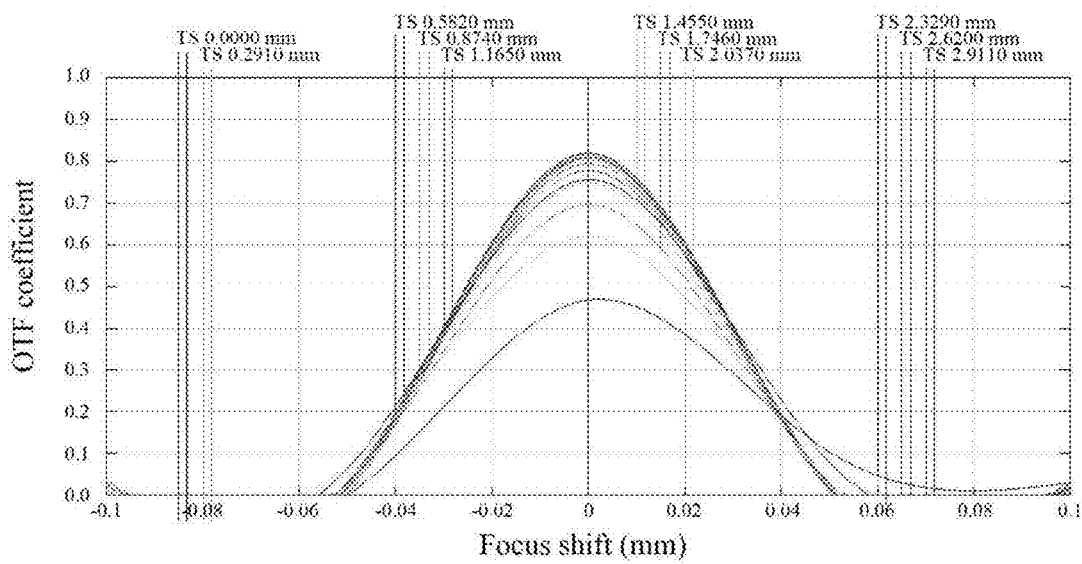
FIG. 18A and FIG. 18B respectively illustrate a focus shift curve diagram and an MTF curve diagram of the optical imaging lens assembly of Example 4 within a waveband range of 430 nm to 650 nm, when a distance from the object to the optical imaging lens assembly is 350 mm.
Figure 18B:
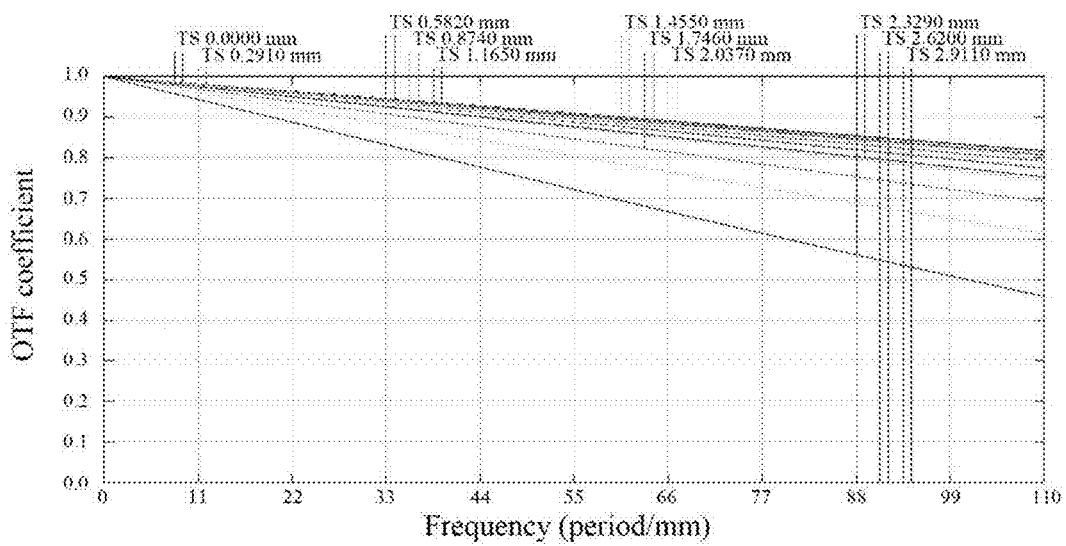
Figure 19A:
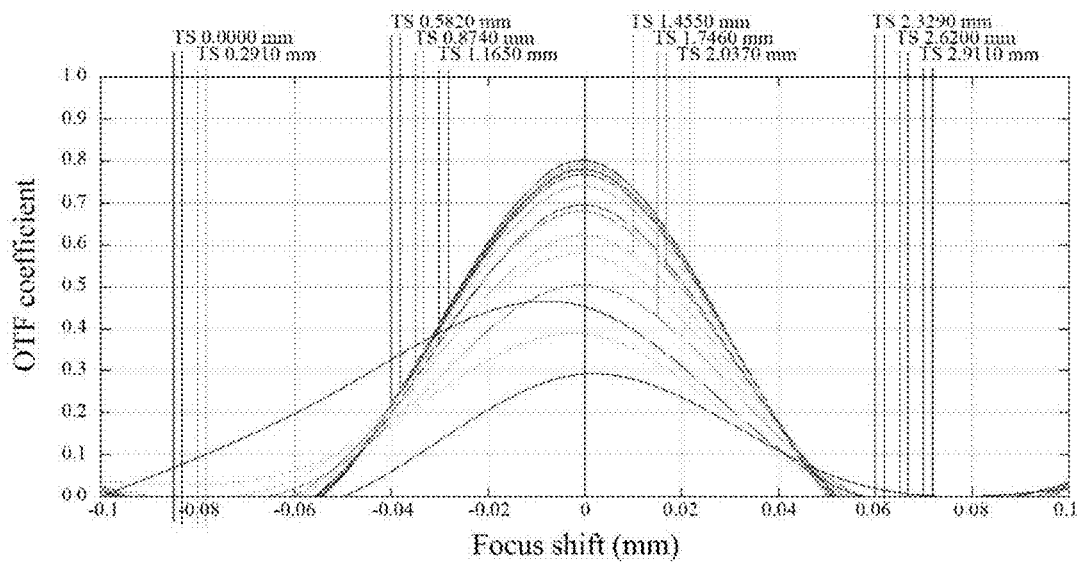
FIG. 19A and FIG. 19B respectively illustrate a focus shift curve diagram and an MTF curve diagram of the optical imaging lens assembly of Example 4 within a waveband range of 430 nm to 650 nm, when a distance from the object to the optical imaging lens assembly is 150 mm.
Figure 19B:
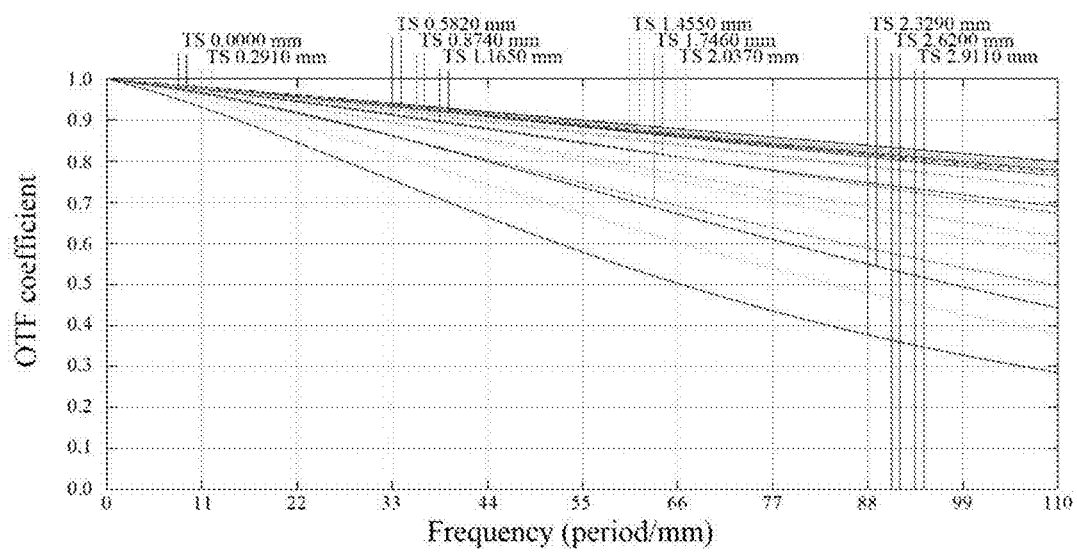
Figure 20A:
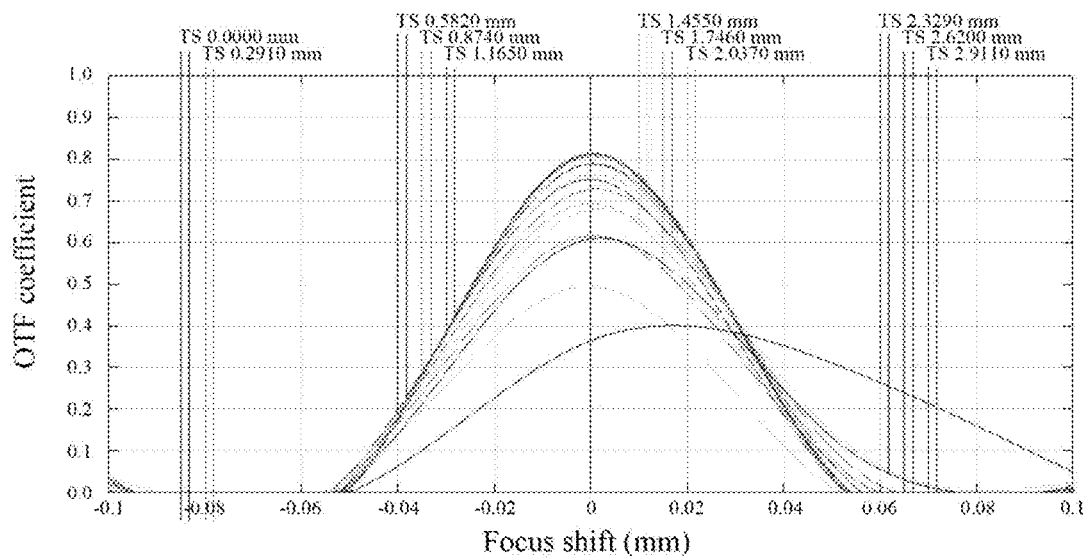
FIG. 20A and FIG. 20B respectively illustrate a focus shift curve diagram and an MTF curve diagram of the optical imaging lens assembly of Example 4 within a waveband range of 430 nm to 650 nm, when a distance from the object to the optical imaging lens assembly is infinite.
Figure 20B:
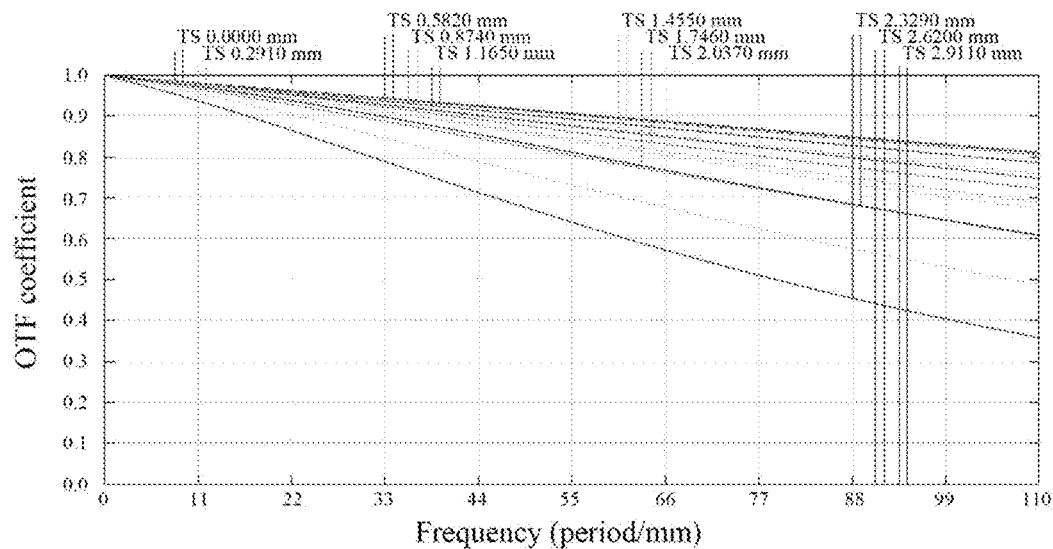

FIG. 17A illustrates the longitudinal aberration curve of the optical imaging lens assembly according to Example 4, representing deviations of focal points converged by light of different wavelengths after passing through the lens assembly. FIG. 17B illustrates the astigmatic curve of the optical imaging lens assembly according to Example 4, representing a curvature of a tangential plane and a curvature of a sagittal plane. FIG. 17C illustrates the distortion curve of the optical imaging lens assembly according to Example 4, representing the amounts of distortion corresponding to different image heights. FIG. 17D illustrates the lateral color curve of the optical imaging lens assembly according to Example 4, representing deviations of different image heights on an imaging plane after light passes through the lens assembly. FIG. 18A, FIG. 19A and FIG. 20A respectively illustrate focus shift curve diagrams of the optical imaging lens assembly of Example 4 within a waveband range of 430 nm to 650 nm, when the distances from the object to the optical imaging lens assembly are 350 mm, 150 mm and infinite, representing the pixel sizes in a tangential field-of-view and a sagittal field-of-view under different focal shifts. FIG. 18B, FIG. 19B and FIG. 20B respectively illustrate MTF curve diagrams of the optical imaging lens assembly of Example 4 within a waveband range of 430 nm to 650 nm, when the distances from the object to the optical imaging lens assembly are 350 mm, 150 mm and infinite, representing the pixel sizes in a tangential field-of-view and a sagittal field-of-view at different frequencies. It can be seen from FIG. 17A to FIG. 20B that the optical imaging lens assembly provided in Example 4 can achieve a good imaging quality.

TABLE 8

| Surface number | A4 | A6 | A8 | A10 | A12 | A14 | A16 | A18 | A20 |
|---|---|---|---|---|---|---|---|---|---|
| S1 | 1.4900E−02 | 6.2236E−04 | 1.0161E−04 | 9.2942E−06 | 3.7111E−07 | 4.9482E−06 | 1.1778E−06 | 1.7190E−06 | −2.3000E−07 |
| S3 | −1.5407E−02 | 6.7535E−03 | 9.0744E−04 | 2.6380E−04 | 8.4883E−05 | 6.0295E−05 | 2.6050E−05 | 6.9326E−06 | −8.5485E−08 |
| S4 | 2.8673E−03 | 1.8600E−03 | 2.9640E−04 | 9.4492E−05 | 1.3903E−05 | 2.4645E−06 | 1.2068E−06 | 9.7514E−07 | 5.9981E−07 |
| S5 | 2.2528E−01 | 4.6474E−03 | −1.0223E−02 | 3.1560E−03 | −9.6607E−05 | −2.6889E−04 | 1.4735E−04 | 4.1238E−06 | −3.1271E−05 |
| S6 | 3.5880E−02 | 1.1134E−01 | −3.0824E−02 | 3.5071E−03 | 2.8066E−03 | −1.0883E−03 | 1.8145E−04 | 2.4924E−04 | −1.4393E−04 |
| S7 | 2.2341E−02 | 3.6940E−02 | −2.0833E−02 | 5.1446E−03 | −1.3685E−03 | −1.1059E−04 | 6.9223E−05 | −4.4145E−05 | −5.0840E−06 |
| S8 | 1.0471E−02 | 3.2468E−02 | −2.4221E−02 | 3.6697E−03 | −2.9488E−05 | −2.0568E−03 | 2.4997E−04 | −1.7015E−04 | 1.6393E−05 |
| S9 | −6.3911E−02 | −3.8843E−02 | 1.6715E−02 | 7.1348E−03 | −1.5023E−03 | −2.0827E−03 | 1.5182E−04 | −2.1489E−04 | 2.5623E−04 |
| S10 | 1.5431E−01 | 3.2855E−02 | −1.0303E−02 | −2.5449E−03 | 2.9924E−03 | −1.9660E−04 | −4.8699E−04 | −3.6942E−05 | 4.1252E−05 |
| S11 | −1.1175E+00 | 4.6510E−01 | −1.5434E−01 | 2.3662E−02 | 1.7450E−03 | 2.6903E−03 | −3.7670E−03 | 1.1320E−03 | 3.1056E−04 |
| S12 | −1.1463E+00 | 1.7865E−01 | −6.0924E−02 | 3.1622E−02 | −1.0015E−02 | 3.9785E−03 | −1.8810E−03 | 7.7722E−04 | −8.4287E−05 |

Example 5

Figure 21:
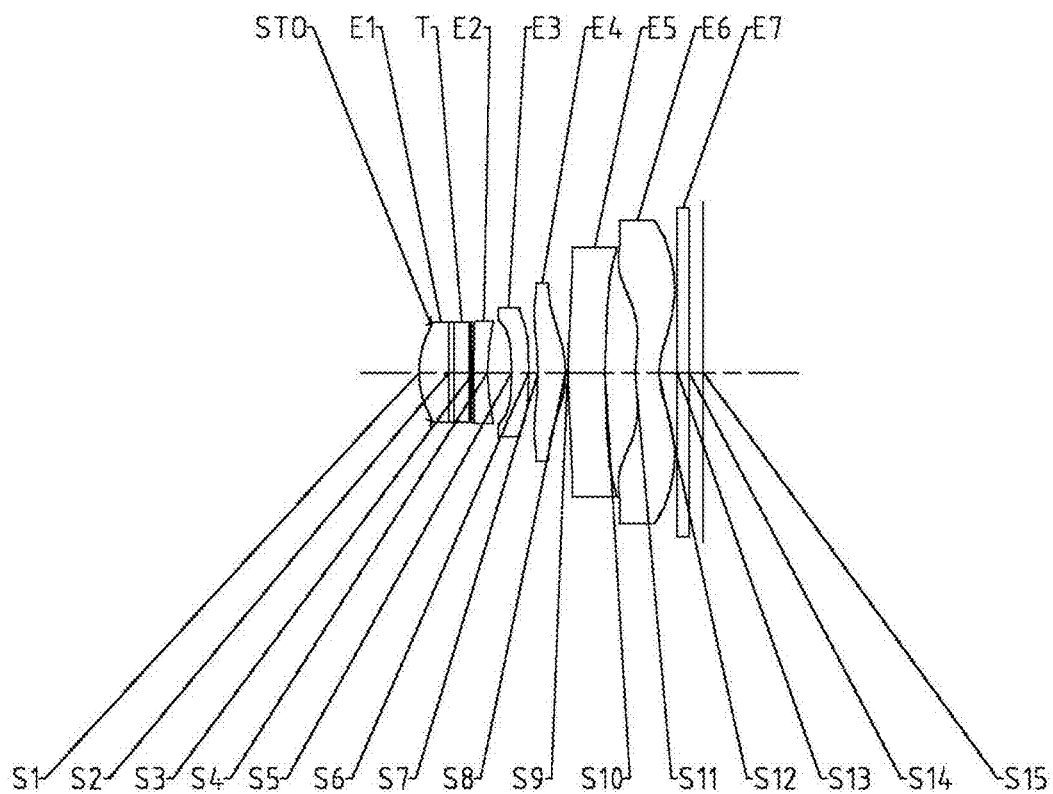
FIG. 21 is a schematic structural diagram illustrating an optical imaging lens assembly according to Example 5 of the present disclosure.

An optical imaging lens assembly according to Example 5 of the present disclosure is described below with reference to FIG. 21 to FIG. 25B. FIG. 21 illustrates a schematic structural diagram of the optical imaging lens assembly according to Example 5 of the present disclosure.

As shown in FIG. 21, the optical imaging lens assembly from an object side to an image side sequentially includes: a stop STO, a first lens E1, an autofocus component T (including a light-transmitting module, a liquid material and a flexible film), a second lens E2, a third lens E3, a fourth lens E4, a fifth lens E5, a sixth lens E6, an optical filter E7 and an imaging plane S15.

The first lens E1 has a positive refractive power, an object-side surface S1 of the first lens is a convex surface, and an image-side surface S2 of the first lens is a flat surface. The second lens E2 has a negative refractive power, an object-side surface S3 of the second lens is a convex surface, and an image-side surface S4 of the second lens is a concave surface. The third lens E3 has a negative refractive power, an object-side surface S5 of the third lens is a concave surface, and an image-side surface S6 of the third lens is a convex surface. The fourth lens E4 has a positive refractive power, an object-side surface S7 of the fourth lens is a concave surface, and an image-side surface S8 of the fourth lens is a convex surface. The fifth lens E5 has a positive refractive power, an object-side surface S9 of the fifth lens is a convex surface, and an image-side surface S10 of the fifth lens is a concave surface. The sixth lens E6 has a negative refractive power, an object-side surface S11 of the sixth lens is a convex surface, and an image-side surface S12 of the sixth lens is a concave surface. The optical filter E7 has an object-side surface S13 and an image-side surface S14. The first lens E1 and the light-transmitting module may be cemented together. Light from an object sequentially passes through the surfaces S1 to S14 and is finally imaged on the imaging plane S15.

In this example, the total effective focal length f of the optical imaging lens assembly is 3.90 mm, the total track length TTL of the optical imaging lens assembly is 5.03 mm, a half of a diagonal length ImgH of an effective pixel area on the imaging plane S15 of the optical imaging lens assembly is 3.01 mm, a half of a maximum field-of-view Semi-FOV of the optical imaging lens assembly is 36.3°, and an F number Fno of the optical imaging lens assembly is 2.43.

Table 9 is a table illustrating basic parameters of the optical imaging lens assembly of Example 5, where the units for the radius of curvature, the thickness/distance and the focal length are millimeter (mm). Table 10 shows high-order coefficients applicable to each aspheric surface in Example 5, where the surface shape of each aspheric surface may be defined by the formula (1) given in the above Example 1.

TABLE 9

| Surface number | Surface type | Radius of curvature | Thickness/ Distance | Material Refractive index | Material Abbe number | Focal length | Conic coefficient |
|---|---|---|---|---|---|---|---|
| OBJ | Spherical | infinite | D1 | | | | |
| STO | Spherical | infinite | −0.2082 | | | | |
| S1 | Aspheric | 1.6729 | 0.5262 | 1.55 | 56.1 | 3.05 | −0.6796 |
| S2 | Spherical | infinite | 0.0000 | | | | |
| | Spherical | infinite | 0.1000 | 1.52 | 64.2 | | |
| | Spherical | infinite | 0.2650 | 1.57 | 29.9 | | |
| | Spherical | RT | 0.0200 | 1.53 | 65.4 | | |
| | Spherical | | 0.0500 | | | | |
| S3 | Aspheric | 15.2180 | 0.2500 | 1.67 | 20.4 | −6.27 | 51.7939 |
| S4 | Aspheric | 3.2572 | 0.4295 | | | | −12.5807 |
| S5 | Aspheric | −11.5440 | 0.3058 | 1.67 | 20.4 | −17.41 | 89.1405 |
| S6 | Aspheric | −2389.4037 | 0.1572 | | | | 90.0000 |
| S7 | Aspheric | −6.8471 | 0.4892 | 1.55 | 56.1 | 5.63 | −87.3912 |
| S8 | Aspheric | −2.1753 | 0.0400 | | | | −4.1339 |
| S9 | Aspheric | 10.7871 | 0.6586 | 1.55 | 56.1 | 122.07 | 29.0892 |
| S10 | Aspheric | 12.5932 | 0.5351 | | | | −90.0000 |
| S11 | Spherical | 2.0746 | 0.4196 | 1.54 | 55.8 | −4.76 | −8.3344 |
| S12 | Spherical | 1.0643 | 0.3281 | | | | −4.5507 |
| S13 | Spherical | infinite | 0.2100 | 1.52 | 64.2 | | |
| S14 | Spherical | infinite | 0.2474 | | | | |
| S15 | Spherical | infinite | | | | | |

In this example, an object-side surface of the liquid material and an image-side surface the light-transmitting module may be cemented together. By changing the radius of curvature of a flexible film surface of the autofocus component T and the radius of curvature of an image-side surface of the liquid material of the autofocus component T, the total effective focal length of the optical imaging lens assembly may be changed with the change of a distance from the object to the optical imaging lens assembly, thereby realizing the autofocus function of the optical imaging lens assembly. Specifically, when the distance D1 between the optical imaging lens assembly and the object is 350 mm, the image-side surface of the autofocus component T is a convex surface, and the radius of curvature RT is −280.0000 mm. When the distance D1 between the optical imaging lens assembly and the object is 150 mm, the image-side surface of the autofocus component T is a convex surface, and the radius of curvature RT is −78.6100. When the distance D1 between the optical imaging lens assembly and the object is infinite, the image-side surface of the autofocus component T is a concave surface, and the radius of curvature RT is 299.8000.

TABLE 10

| Surface number | A4 | A6 | A8 | A10 | A12 | A14 | A16 | A18 | A20 |
|---|---|---|---|---|---|---|---|---|---|
| S1 | 1.4399E−02 | 5.1119E−04 | 2.4216E−06 | 1.3468E−05 | 4.3570E−06 | 7.1733E−06 | 1.8266E−06 | 1.5987E−06 | −4.2343E−07 |
| S3 | −1.1454E−02 | 2.5877E−03 | 2.1973E−04 | 6.4768E−05 | −1.5295E−06 | −5.9708E−07 | −2.4578E−06 | −8.4009E−07 | −9.1021E−07 |
| S4 | −6.6500E−05 | −7.5466E−04 | −9.4034E−05 | 2.0767E−05 | 1.4763E−06 | 2.6421E−06 | 3.3797E−08 | 7.9683E−07 | −4.5390E−08 |
| S5 | −1.7363E−01 | −9.3247E−03 | 5.6487E−04 | 6.7877E−04 | 1.3333E−04 | 1.9032E−05 | −3.2349E−06 | −1.3151E−06 | 1.9261E−06 |
| S6 | −1.9694E−01 | 2.0721E−02 | 5.2973E−03 | 2.2153E−03 | 5.1157E−05 | −5.2042E−05 | −2.8963E−05 | −7.8088E−06 | 3.4935E−06 |
| S7 | 2.7061E−02 | 3.7357E−02 | −1.5725E−02 | 3.6415E−03 | −6.9015E−04 | −1.2512E−04 | 8.2101E−05 | −2.3512E−05 | 2.3788E−06 |
| S8 | 7.4887E−02 | 5.7088E−02 | −2.2242E−02 | 1.6180E−03 | 2.4942E−04 | −6.1899E−04 | −1.1628E−04 | 1.4859E−04 | −2.5843E−05 |
| S9 | −1.3153E−01 | −1.0142E−02 | 2.8930E−03 | −1.5456E−04 | −2.7724E−05 | −4.0046E−04 | −2.4570E−04 | 1.5910E−04 | −7.9933E−05 |
| S10 | 3.5018E−02 | 2.6201E−02 | −3.4345E−03 | −4.3463E−03 | 2.3397E−03 | 4.9190E−04 | −8.1850E−04 | 4.1097E−04 | −1.9509E−04 |
| S11 | −1.1875E+00 | 4.3305E−01 | −9.9918E−02 | 1.0388E−02 | −5.3649E−03 | 5.5674E−03 | −2.1994E−03 | 3.1671E−04 | 0.0000E+00 |
| S12 | −1.3187E+00 | 2.5567E−01 | −7.0775E−02 | 2.4784E−02 | −1.3845E−02 | 4.1761E−03 | −2.2151E−03 | 7.2949E−04 | −1.9183E−04 |

Figure 22A:
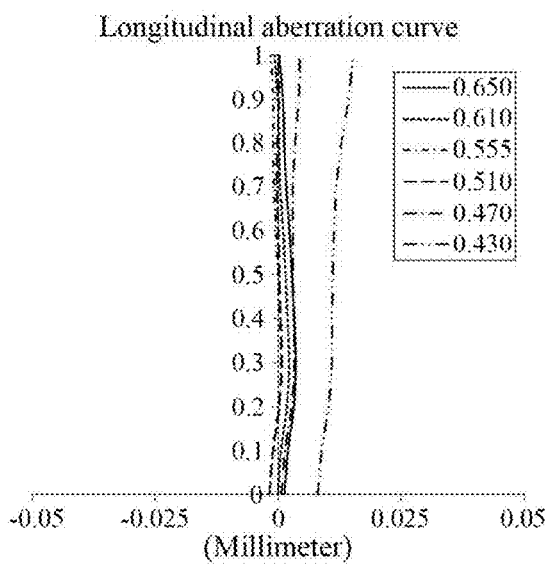
FIGS. 22A-22D respectively illustrate a longitudinal aberration curve, an astigmatic curve, a distortion curve and a lateral color curve of the optical imaging lens assembly of Example 5.
Figure 22B:
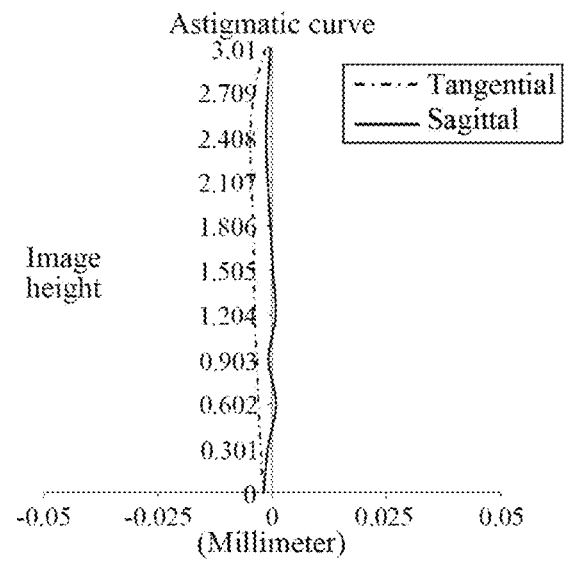
Figure 22C:
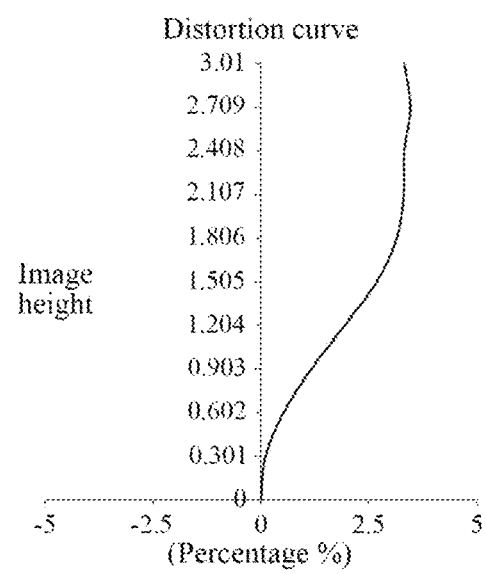
Figure 22D:
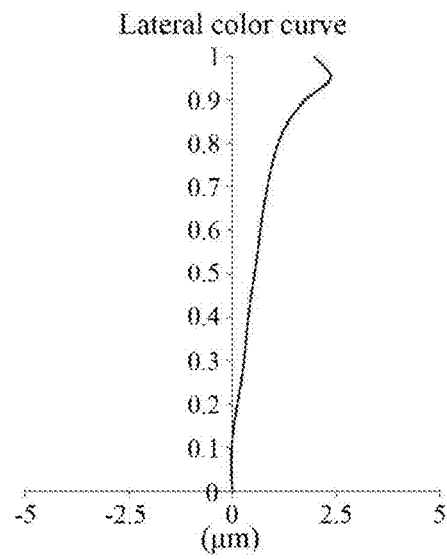
Figure 23A:
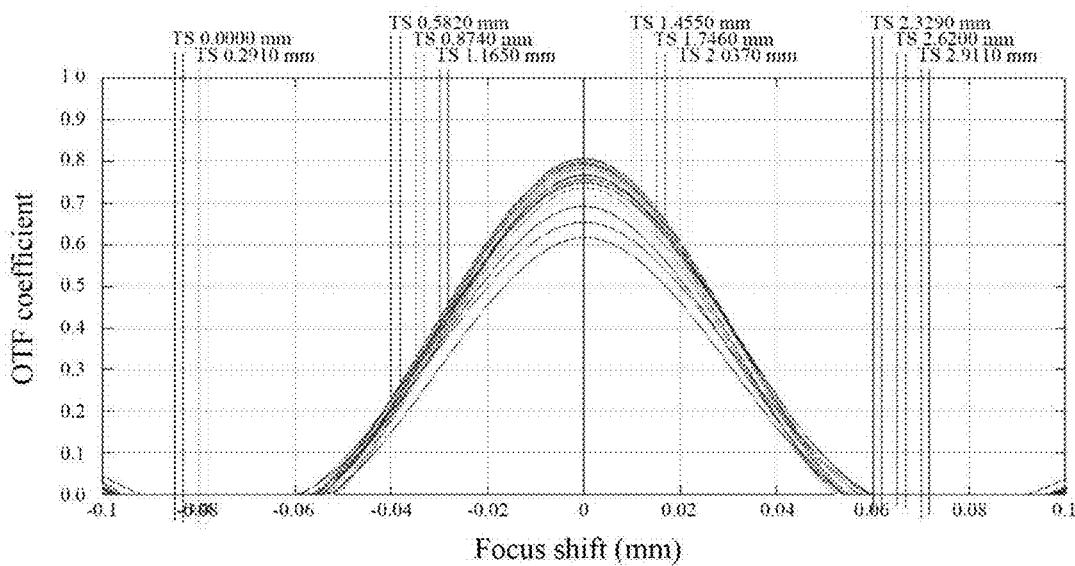
FIG. 23A and FIG. 23B respectively illustrate a focus shift curve diagram and an MTF curve diagram of the optical imaging lens assembly of Example 5 within a waveband range of 430 nm to 650 nm, when a distance from the object to the optical imaging lens assembly is 350 mm.
Figure 23B:
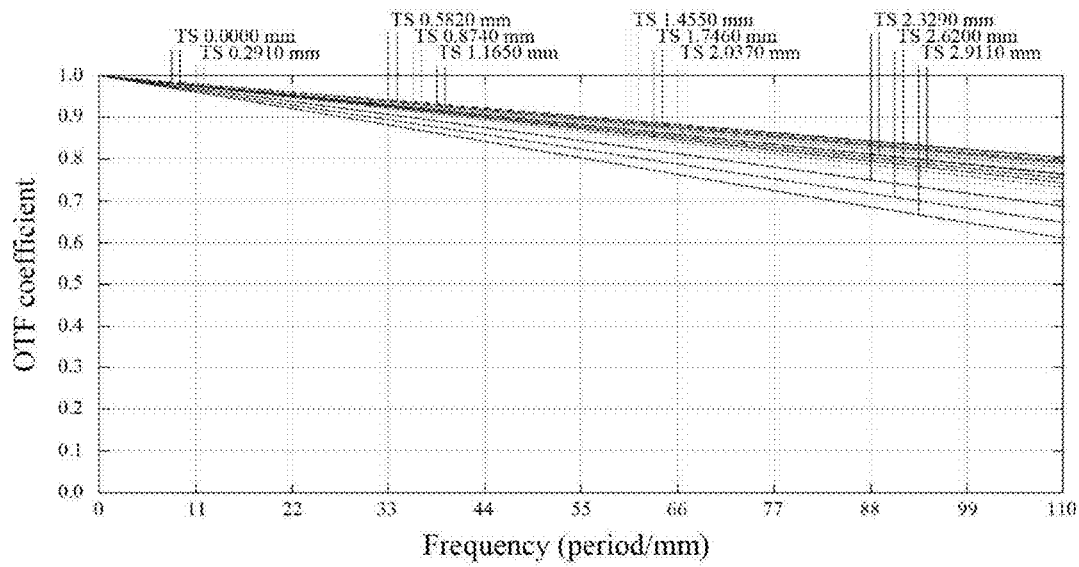
Figure 24A:
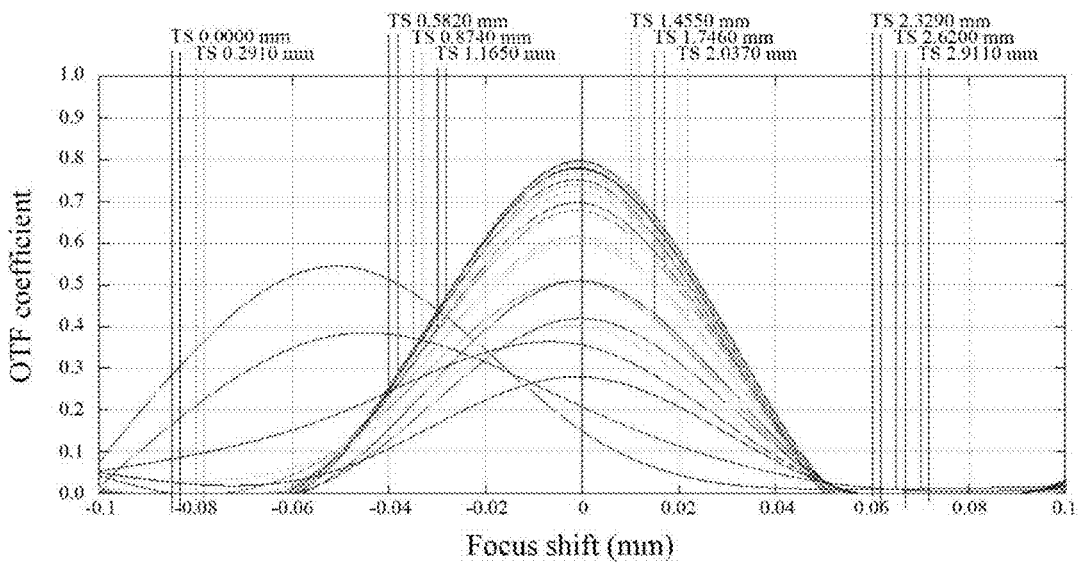
FIG. 24A and FIG. 24B respectively illustrate a focus shift curve diagram and an MTF curve diagram of the optical imaging lens assembly of Example 5 within a waveband range of 430 nm to 650 nm, when a distance from the object to the optical imaging lens assembly is 150 mm.
Figure 24B:
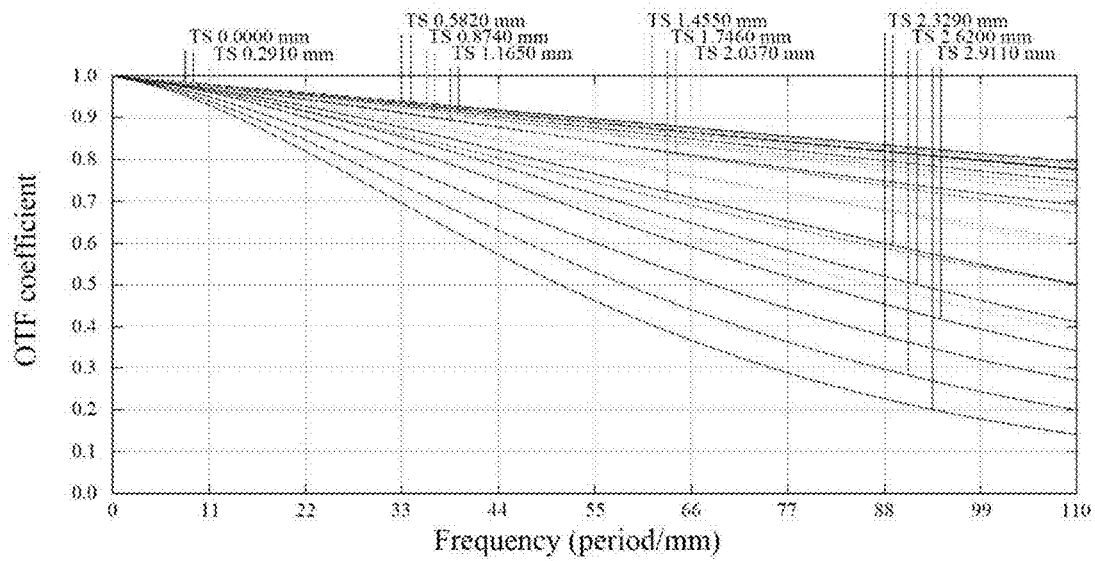
Figure 25A:
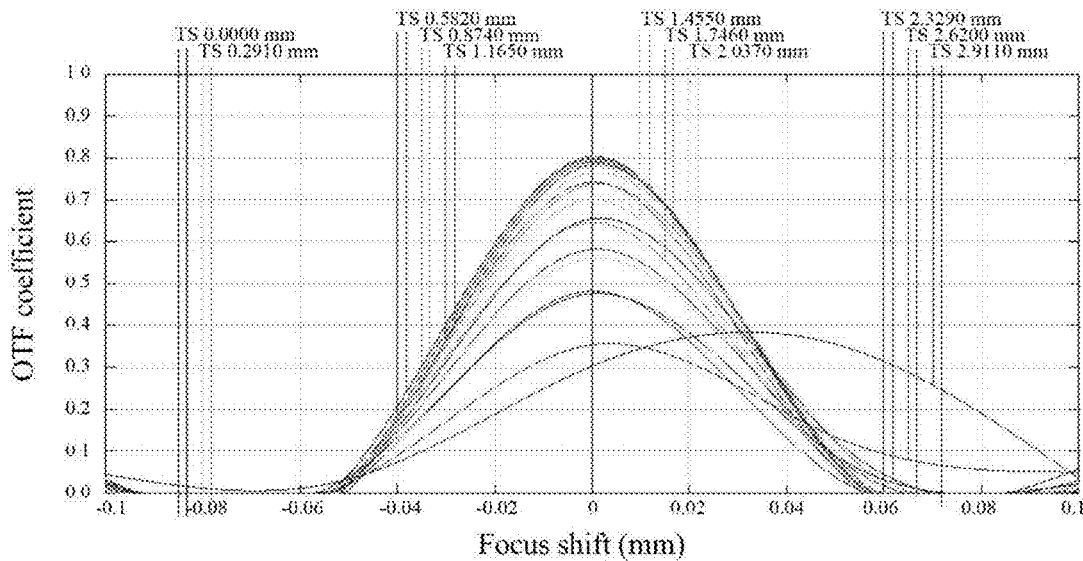
FIG. 25A and FIG. 25B respectively illustrate a focus shift curve diagram and an MTF curve diagram of the optical imaging lens assembly of Example 5 within a waveband range of 430 nm to 650 nm, when a distance from the object to the optical imaging lens assembly is infinite.
Figure 25B:
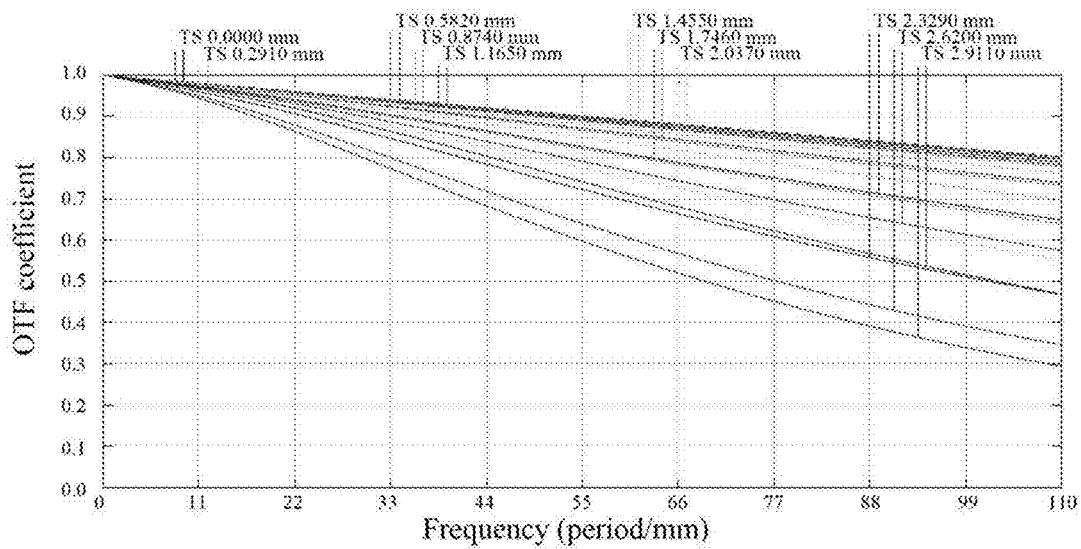

FIG. 22A illustrates the longitudinal aberration curve of the optical imaging lens assembly according to Example 5, representing deviations of focal points converged by light of different wavelengths after passing through the lens assembly. FIG. 22B illustrates the astigmatic curve of the optical imaging lens assembly according to Example 5, representing a curvature of a tangential plane and a curvature of a sagittal plane. FIG. 22C illustrates the distortion curve of the optical imaging lens assembly according to Example 5, representing the amounts of distortion corresponding to different image heights. FIG. 22D illustrates the lateral color curve of the optical imaging lens assembly according to Example 5, representing deviations of different image heights on an imaging plane after light passes through the lens assembly. FIG. 23A, FIG. 24A and FIG. 25A respectively illustrate focus shift curve diagrams of the optical imaging lens assembly of Example 5 within a waveband range of 430 nm to 650 nm, when the distances from the object to the optical imaging lens assembly are 350 mm, 150 mm and infinite, representing the pixel sizes in a tangential field-of-view and a sagittal field-of-view under different focal shifts. FIG. 23B, FIG. 24B and FIG. 25B respectively illustrate MTF curve diagrams of the optical imaging lens assembly of Example 5 within a waveband range of 430 nm to 650 nm, when the distances from the object to the optical imaging lens assembly are 350 mm, 150 mm and infinite, representing the pixel sizes in a tangential field-of-view and a sagittal field-of-view at different frequencies. It can be seen from FIG. 22A to FIG. 25B that the optical imaging lens assembly provided in Example 5 can achieve a good imaging quality.

Example 6

Figure 26:
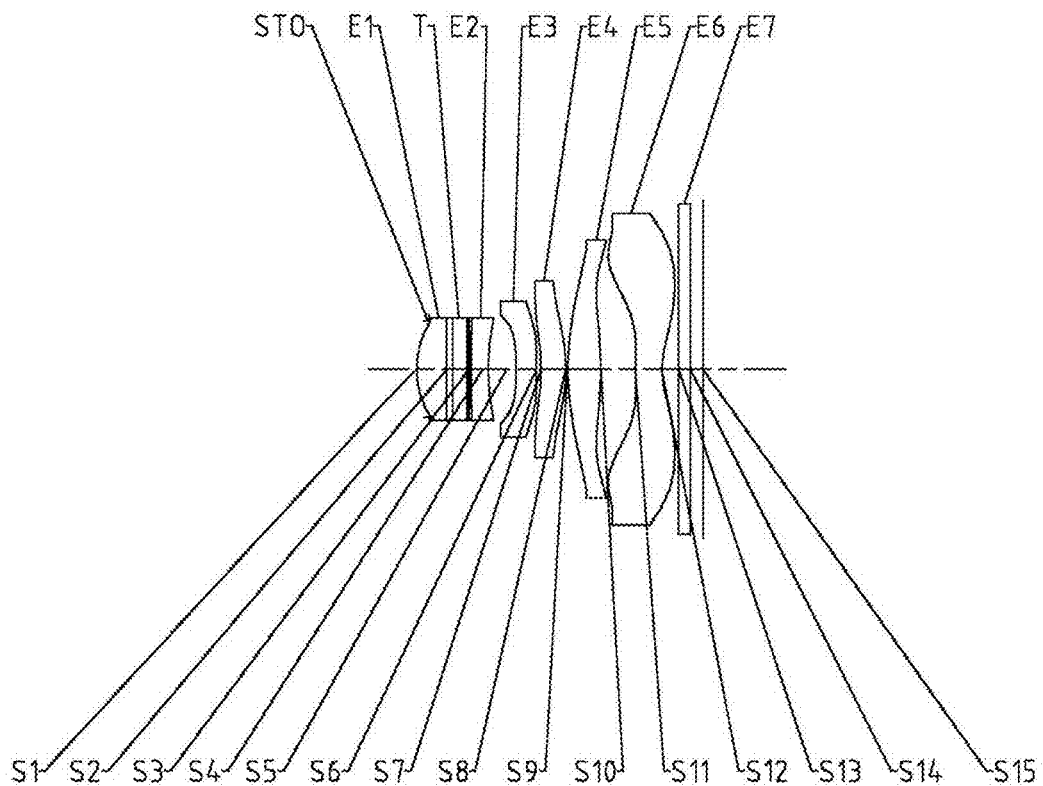
FIG. 26 is a schematic structural diagram illustrating an optical imaging lens assembly according to Example 6 of the present disclosure.

An optical imaging lens assembly according to Example 6 of the present disclosure is described below with reference to FIG. 26 to FIG. 30B. FIG. 26 illustrates a schematic structural diagram of the optical imaging lens assembly according to Example 6 of the present disclosure.

As shown in FIG. 26, the optical imaging lens assembly from an object side to an image side sequentially includes: a stop STO, a first lens E1, an autofocus component T (including a light-transmitting module, a liquid material and a flexible film), a second lens E2, a third lens E3, a fourth lens E4, a fifth lens E5, a sixth lens E6, an optical filter E7 and an imaging plane S15.

The second lens E2 has a negative refractive power, an object-side surface S3 of the second lens is a convex surface, and an image-side surface S4 of the second lens is a concave surface. The third lens E3 has a negative refractive power, an object-side surface S5 of the third lens is a concave surface, and an image-side surface S6 of the third lens is a concave surface. The fourth lens E4 has a positive refractive power, an object-side surface S7 of the fourth lens is a concave surface, and an image-side surface S8 of the fourth lens is a convex surface. The fifth lens E5 has a positive refractive power, an object-side surface S9 of the fifth lens is a convex surface, and an image-side surface S10 of the fifth lens is a convex surface. The sixth lens E6 has a negative refractive power, an object-side surface S11 of the sixth lens is a convex surface, and an image-side surface S12 of the sixth lens is a concave surface. The optical filter E7 has an object-side surface S13 and an image-side surface S14. The first lens E1 and the light-transmitting module may be cemented together. Light from an object sequentially passes through the surfaces S1 to S14 and is finally imaged on the imaging plane S15.

In this example, the total effective focal length f of the optical imaging lens assembly is 4.00 mm, the total track length TTL of the optical imaging lens assembly is 5.12 mm, a half of a diagonal length ImgH of an effective pixel area on the imaging plane S15 of the optical imaging lens assembly is 3.01 mm, a half of a maximum field-of-view Semi-FOV of the optical imaging lens assembly is 35.5°, and an F number Fno of the optical imaging lens assembly is 2.43.

Table 11 is a table illustrating basic parameters of the optical imaging lens assembly of Example 6, where the units for the radius of curvature, the thickness/distance and the focal length are millimeter (mm). Table 12 shows high-order coefficients applicable to each aspheric surface in Example 6, where the surface shape of each aspheric surface may be defined by the formula (1) given in the above Example 1.

TABLE 11

| Surface number | Surface type | Radius of curvature | Thickness/ Distance | Material | | Focal length | Conic coefficient |
|---|---|---|---|---|---|---|---|
| | | | | Refractive index | Abbe number | | |
| OBJ | Spherical | infinite | D1 | | | | |
| STO | Spherical | infinite | −0.2224 | | | | |

TABLE 11-continued

| Surface number | Surface type | Radius of curvature | Thickness/ Distance | Material Refractive index | Abbe number | Focal length | Conic coefficient |
|---|---|---|---|---|---|---|---|
| S1 | Aspheric | 1.6715 | 0.5404 | 1.55 | 56.1 | 3.05 | −0.6350 |
| S2 | Spherical | infinite | 0.0000 | | | | |
|  | Spherical | infinite | 0.1000 | 1.52 | 64.2 | | |
|  | Spherical | infinite | 0.2650 | 1.57 | 29.9 | | |
|  | Spherical | RT | 0.0200 | 1.53 | 65.4 | | |
|  | Spherical |  | 0.0500 | | | | |
| S3 | Aspheric | 15.0000 | 0.3000 | 1.67 | 20.4 | −6.99 | −90.0000 |
| S4 | Aspheric | 3.5245 | 0.5039 | | | | −15.7931 |
| S5 | Aspheric | −10.5725 | 0.3653 | 1.67 | 20.4 | −8.15 | −32.7427 |
| S6 | Aspheric | 11.3224 | 0.0796 | | | | −5.1638 |
| S7 | Aspheric | −5.9529 | 0.4432 | 1.55 | 56.1 | 26.83 | −6.7552 |
| S8 | Aspheric | −4.3438 | 0.0300 | | | | 0.0991 |
| S9 | Aspheric | 3.8355 | 0.6000 | 1.55 | 56.1 | 4.27 | −29.1485 |
| S10 | Aspheric | −5.6122 | 0.6152 | | | | −24.1654 |
| S11 | Aspheric | 4.6117 | 0.4708 | 1.54 | 55.8 | −3.49 | −13.4570 |
| S12 | Aspheric | 1.2848 | 0.3045 | | | | −5.5561 |
| S13 | Spherical | infinite | 0.2100 | 1.52 | 64.2 | | |
| S14 | Spherical | infinite | 0.2230 | | | | |
| S15 | Spherical | infinite | | | | | |

Figure 27C:
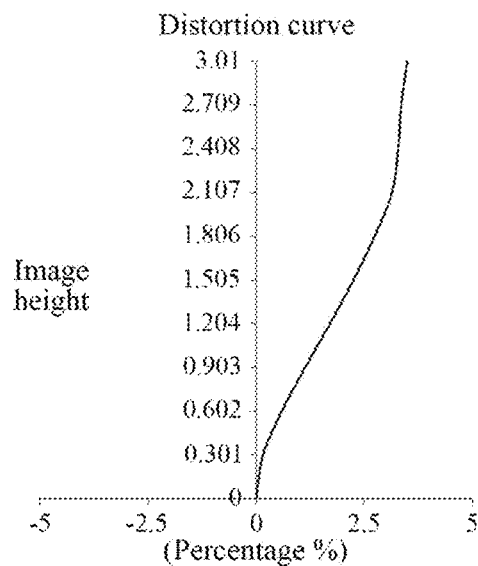
Figure 27D:
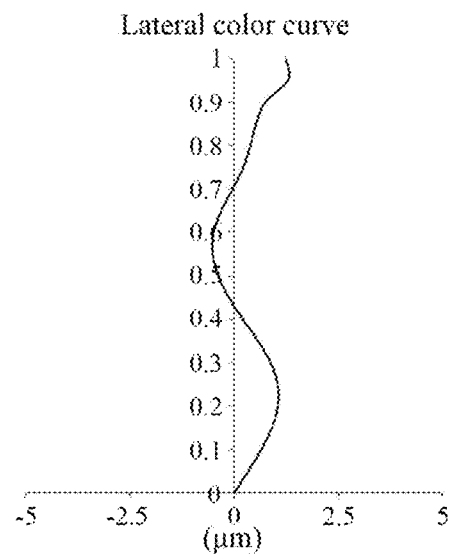
Figure 28A:
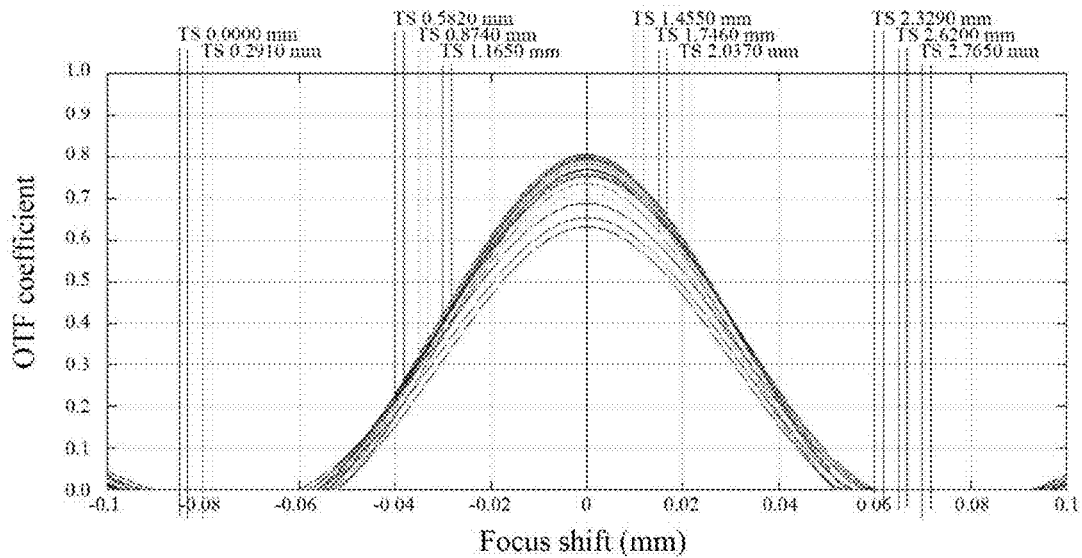
FIG. 28A and FIG. 28B respectively illustrate a focus shift curve diagram and an MTF curve diagram of the optical imaging lens assembly of Example 6 within a waveband range of 430 nm to 650 nm, when a distance from the object to the optical imaging lens assembly is 350 mm.
Figure 28B:
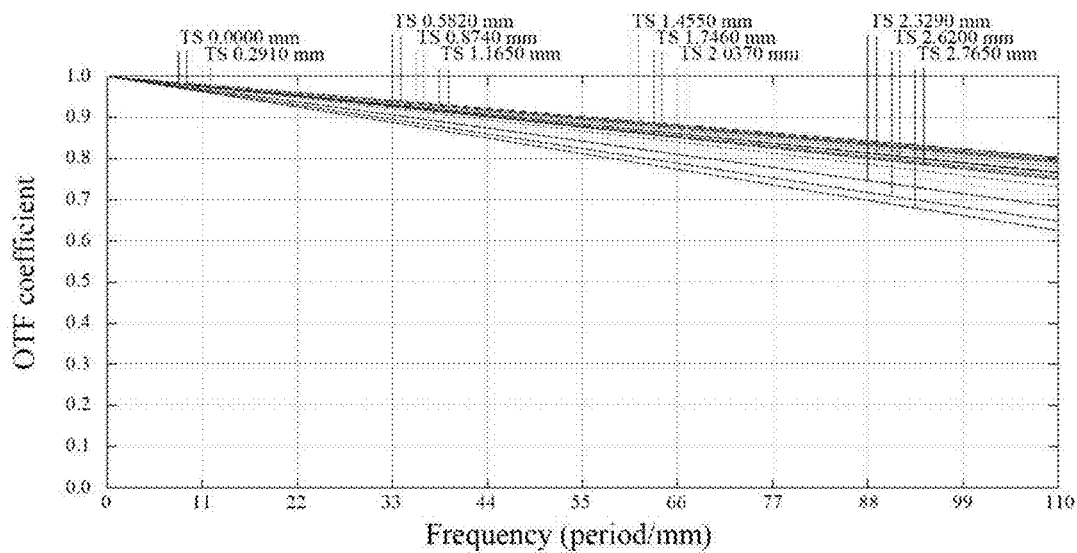
Figure 29A:
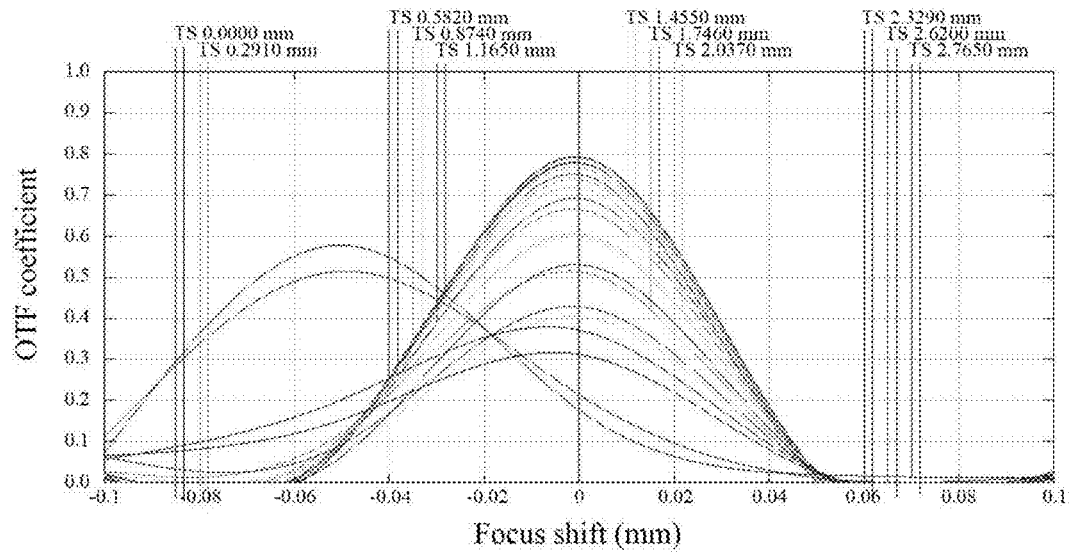
FIG. 29A and FIG. 29B respectively illustrate a focus shift curve diagram and an MTF curve diagram of the optical imaging lens assembly of Example 6 within a waveband range of 430 nm to 650 nm, when a distance from the object to the optical imaging lens assembly is 150 mm.
Figure 29B:
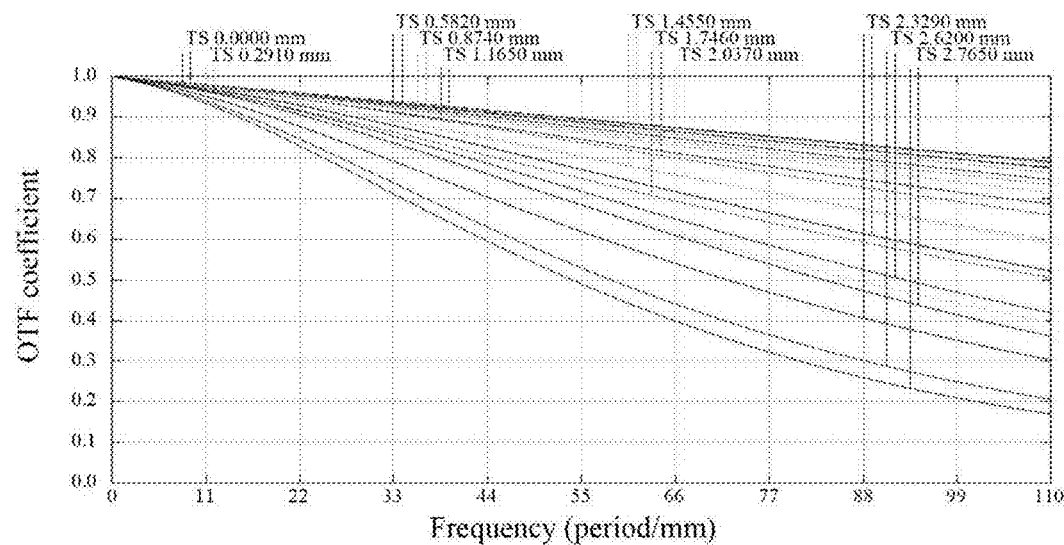
Figure 30A:
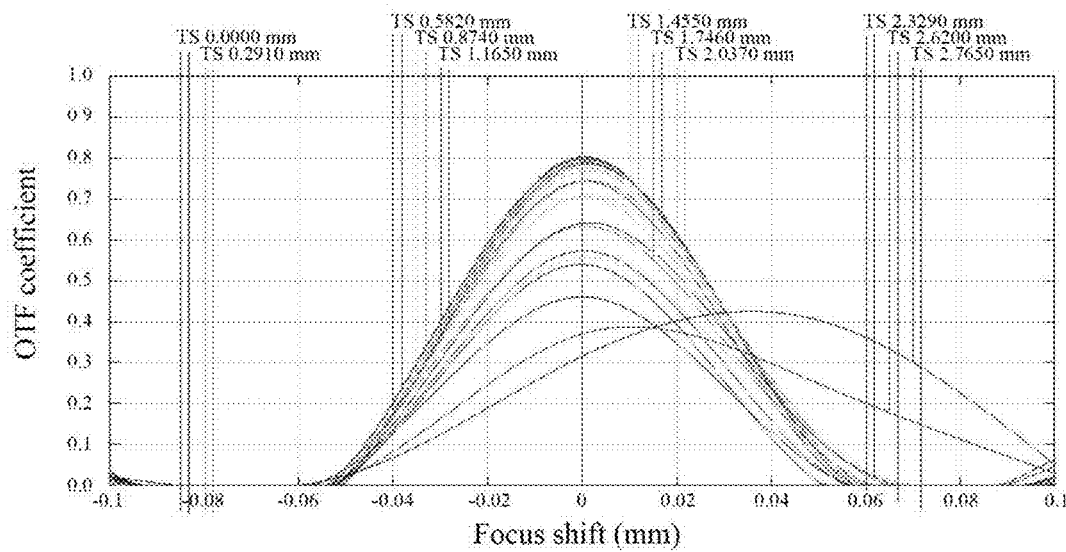
FIG. 30A and FIG. 30B respectively illustrate a focus shift curve diagram and an MTF curve diagram of the optical imaging lens assembly of Example 6 within a waveband range of 430 nm to 650 nm, when a distance from the object to the optical imaging lens assembly is infinite.
Figure 30B:
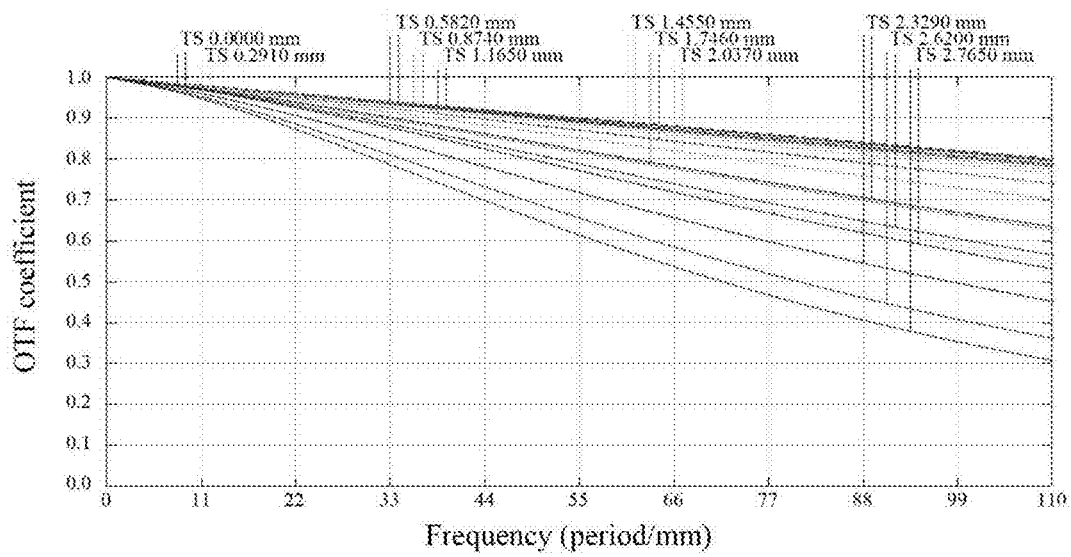

In this example, an object-side surface of the liquid material and an image-side surface the light-transmitting module may be cemented together. By changing the radius of curvature of a flexible film surface of the autofocus component T and the radius of curvature of an image-side surface of the liquid material of the autofocus component T, the total effective focal length of the optical imaging lens assembly may be changed with the change of a distance from the object to the optical lens assembly, thereby realizing the autofocus function of the optical imaging lens assembly. Specifically, when the distance D1 between the optical imaging lens assembly and the object is 350 mm, the image-side surface of the autofocus component T is a convex surface, and the radius of curvature RT is −287.0000 mm. When the distance D1 between the optical imaging lens assembly and the object is 150 mm, the image-side surface of the autofocus component T is a convex surface, and the radius of curvature RT is −78.8000. When the distance D1 between the optical imaging lens assembly and the object is infinite, the image-side surface of the autofocus component T is a concave surface, and the radius of curvature RT is 288.0000.

imaging lens assembly according to Example 6, representing a curvature of a tangential plane and a curvature of a sagittal plane. FIG. 27C illustrates the distortion curve of the optical imaging lens assembly according to Example 6, representing the amounts of distortion corresponding to different image heights. FIG. 27D illustrates the lateral color curve of the optical imaging lens assembly according to Example 6, representing deviations of different image heights on an imaging plane after light passes through the lens assembly. FIG. 28A, FIG. 29A and FIG. 30A respectively illustrate focus shift curve diagrams of the optical imaging lens assembly of Example 6 within a waveband range of 430 nm to 650 nm, when the distances from the object to the optical imaging lens assembly are 350 mm, 150 mm and infinite, representing the pixel sizes in a tangential field-of-view and a sagittal field-of-view under different focal shifts. FIG. 28B, FIG. 29B and FIG. 30B respectively illustrate MTF curve diagrams of the optical imaging lens assembly of Example 6 within a waveband range of 430 nm to 650 nm, when the distances from the object to the optical imaging lens assembly are 350 mm, 150 mm and infinite, representing the pixel sizes in a tangential field-of-view and a sagittal field-of-view

TABLE 12

| Surface number | A4 | A6 | A8 | A10 | A12 | A14 | A16 | A18 | A20 |
|---|---|---|---|---|---|---|---|---|---|
| S1 | 1.4944E−02 | 6.5804E−04 | 1.3181E−05 | 6.7895E−06 | −2.2983E−06 | 2.8999E−06 | 1.3892E−07 | 1.2646E−06 | −1.7203E−07 |
| S3 | −2.0262E−02 | 6.5044E−03 | 1.8154E−03 | 8.4281E−04 | 4.2554E−04 | 2.4213E−04 | 1.1127E−04 | 3.7350E−05 | 7.4738E−06 |
| S4 | −2.2259E−03 | 2.1521E−04 | 2.1346E−04 | 9.7222E−05 | 1.2844E−05 | 5.2202E−06 | −2.0230E−07 | 7.7368E−07 | −2.5796E−07 |
| S5 | −1.8074E−01 | −4.3618E−03 | 4.4496E−04 | 8.1815E−04 | 8.0986E−05 | 3.6745E−05 | −2.5340E−06 | −9.8462E−06 | −1.3919E−06 |
| S6 | −2.2790E−01 | 2.6184E−02 | −3.7491E−03 | 1.6226E−03 | −3.9489E−05 | 5.3500E−05 | −1.0928E−05 | −7.6752E−06 | 1.0730E−06 |
| S7 | −1.0038E−02 | 3.0978E−02 | −1.1381E−02 | 1.9534E−03 | 6.2561E−06 | −6.7909E−05 | −1.8390E−06 | 5.5716E−06 | −9.5093E−07 |
| S8 | 8.5130E−02 | 9.4603E−02 | −5.6375E−02 | 3.8929E−03 | 3.0157E−03 | 1.1036E−03 | 2.6569E−03 | 1.3454E−03 | 1.3606E−04 |
| S9 | 5.2647E−02 | 6.4595E−02 | −4.6034E−03 | −4.0109E−03 | 2.5376E−03 | −1.0701E−03 | 2.5202E−04 | −5.0879E−05 | 1.5617E−05 |
| S10 | 2.5138E−01 | 1.2668E−02 | −5.4753E−03 | −2.8545E−03 | 5.0942E−03 | 7.0153E−04 | −5.7561E−04 | 1.8476E−04 | −2.0955E−05 |
| S11 | −1.2612E+00 | 5.5858E−01 | −1.6619E−01 | 3.8313E−02 | −1.3850E−02 | 6.2102E−03 | −2.2430E−03 | 8.5974E−04 | −2.1128E−04 |
| S12 | −1.2578E+00 | 2.1019E−01 | −7.5978E−02 | 3.6831E−02 | −1.1464E−02 | 4.8090E−03 | −2.3866E−03 | 8.1310E−04 | −3.0899E−04 |

Figure 27A:
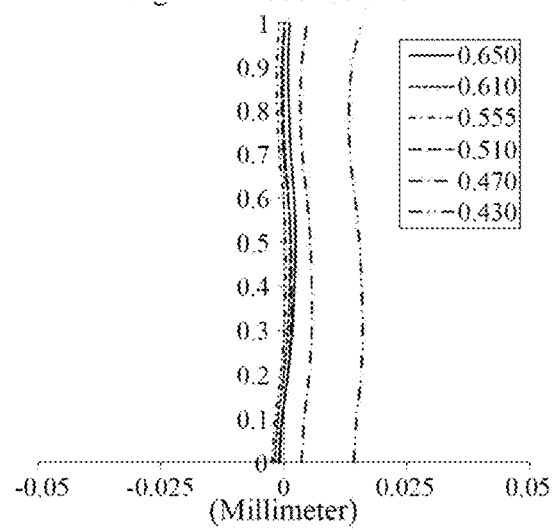
FIGS. 27A-27D respectively illustrate a longitudinal aberration curve, an astigmatic curve, a distortion curve and a lateral color curve of the optical imaging lens assembly of Example 6.
Figure 27B:
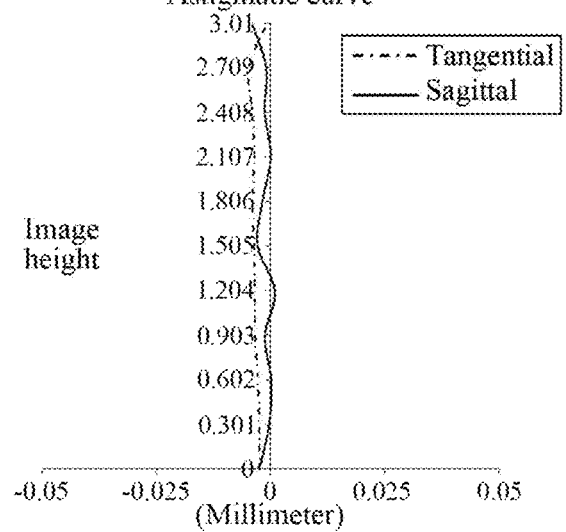

FIG. 27A illustrates the longitudinal aberration curve of the optical imaging lens assembly according to Example 6, representing deviations of focal points converged by light of different wavelengths after passing through the lens assembly. FIG. 27B illustrates the astigmatic curve of the optical at different frequencies. It can be seen from FIG. 27A to FIG. 30B that the optical imaging lens assembly provided in Example 6 can achieve a good imaging quality.

In view of the above, examples 1 to 6 respectively satisfy the relationship shown in Table 13.

TABLE 13

| Conditional/Example | 1 | 2 | 3 | 4 | 5 | 6 |
|---|---|---|---|---|---|---|
| TTL/ImgH | 1.56 | 1.61 | 1.72 | 1.69 | 1.67 | 1.70 |
| TTL/f | 1.28 | 1.20 | 1.29 | 1.30 | 1.29 | 1.28 |
| f/f1 | 1.25 | 1.42 | 1.34 | 1.29 | 1.28 | 1.31 |
| f3/f2 | 4.32 | 2.38 | 4.22 | 2.01 | 2.78 | 1.17 |
| f4/R8 | −1.74 | −1.27 | −3.27 | −1.92 | −2.59 | −6.18 |
| R3/R4 | 4.44 | 4.18 | 6.91 | 4.95 | 4.67 | 4.26 |
| |R9/R10| | 2.89 | 3.28 | 1.49 | 1.06 | 0.86 | 0.68 |
| ΣCT/D | 2.80 | 2.58 | 2.91 | 3.08 | 2.91 | 2.94 |
| TTL/(D + CT1) | 3.41 | 3.23 | 3.55 | 3.44 | 3.50 | 3.49 |
| f/R1 | 2.29 | 2.60 | 2.43 | 2.36 | 2.33 | 2.39 |
| CT4/CT5 | 2.18 | 1.24 | 1.28 | 1.58 | 0.74 | 0.74 |
| CT3/CT2 | 1.16 | 1.40 | 1.40 | 1.29 | 1.22 | 1.22 |
| T34/$T_{T-2}$ | 3.27 | 2.94 | 1.00 | 1.53 | 3.14 | 1.59 |

The present disclosure further provides an imaging apparatus, having an electronic photosensitive element, which may be a photosensitive Charge-Coupled Device (CCD) or a Complementary Metal-Oxide Semiconductor (CMOS). The imaging apparatus may be an independent imaging device such as a digital camera, or may be an imaging module integrated in a mobile electronic device such as a mobile phone. The imaging apparatus is equipped with the optical imaging lens assembly described above.

The foregoing is only a description of the preferred examples of the present disclosure and the applied technical principles. It should be appreciated by those skilled in the art that the inventive scope of the present disclosure is not limited to the technical solutions formed by the particular combinations of the above technical features. The inventive scope should also cover other technical solutions formed by any combinations of the above technical features or equivalent features thereof without departing from the concept of the invention, such as, technical solutions formed by replacing the features as disclosed in the present disclosure with (but not limited to), technical features with similar functions.

What is claimed is:

1. An optical imaging lens assembly, along an optical axis from an object side to an image side, sequentially comprising:
a first lens having a positive refractive power, and an image-side surface of the first lens is a flat surface;
an autofocus component having a refractive power;
a second lens having a refractive power;
a third lens having a refractive power;
a fourth lens having a refractive power; and
at least one subsequent lens having a refractive power;
wherein the first lens and the autofocus component are cemented together;
a radius of curvature of an image-side surface of the autofocus component is variable;
a distance TTL from an object-side surface of the first lens to an imaging plane of the optical imaging lens assembly on the optical axis, a sum of center thicknesses D of the autofocus component and the first lens on the optical axis, and a center thickness CT1 of the first lens on the optical axis satisfy: 3.0<TTL/(D+CT1)<4.0; and
at least one surface from an object-side surface of the first lens to an image-side surface of the at least one subsequent lens is an aspheric surface.

2. The optical imaging lens assembly according to claim 1, wherein an effective focal length f4 of the fourth lens and a radius of curvature R8 of an image-side surface of the fourth lens satisfy: −6.5<f4/R8<−1.0.

3. The optical imaging lens assembly according to claim 1, wherein a radius of curvature R3 of an object-side surface of the second lens and a radius of curvature R4 of an image-side surface of the second lens satisfy: 4.0<R3/R4<7.0.

4. The optical imaging lens assembly according to claim 1, wherein the at least one subsequent lens includes a fifth lens, and a radius of curvature R9 of an object-side surface of the fifth lens and a radius of curvature R10 of an image-side surface of the fifth lens satisfy: 0.5<|R9/R10|<3.5.

5. The optical imaging lens assembly according to claim 1, wherein the sum of center thicknesses D of the autofocus component and the first lens on the optical axis and a sum of center thicknesses ΣCT of all lenses from the first lens to the at least one subsequent lens on the optical axis satisfy: 2.0<ΣCT/D<3.5.

6. The optical imaging lens assembly according to claim 1, wherein the at least one subsequent lens includes a fifth lens, and a center thickness CT4 of the fourth lens on the optical axis and a center thickness CT5 of the fifth lens on the optical axis satisfy: 0.5<CT4/CT5<2.5.

7. The optical imaging lens assembly according to claim 1, wherein a center thickness CT3 of the third lens on the optical axis and a center thickness CT2 of the second lens on the optical axis satisfy: 1.0<CT3/CT2<1.5.

8. The optical imaging lens assembly according to claim 1, wherein a spaced interval T34 between the third lens and the fourth lens on the optical axis and a spaced interval $T_{T-2}$ between the autofocus component and the second lens on the optical axis satisfy: 1.0<T34/$T_{T-2}$<3.5.

9. The optical imaging lens assembly according to claim 1, wherein the distance TTL from the object-side surface of the first lens to the imaging plane of the optical imaging lens assembly on the optical axis, and a half of a diagonal length ImgH of an effective pixel area on the imaging plane of the optical imaging lens assembly satisfy: 1.5<TTL/ImgH<2.0.

10. The optical imaging lens assembly according to claim 1, wherein the sum of center thicknesses D of the autofocus component and the first lens on the optical axis and a sum of center thicknesses ΣCT of all lenses from the first lens to the at least one subsequent lens on the optical axis satisfy: 2.58≤ΣCT/D<3.5.

11. The optical imaging lens assembly according to claim 1, wherein an effective focal length f2 of the second lens and an effective focal length f3 of the third lens satisfy: 1.0<f3/f2<4.5.

12. The optical imaging lens assembly according to claim 1, wherein a center thickness CT3 of the third lens on the optical axis and a center thickness CT2 of the second lens on the optical axis satisfy: 1.16≤CT3/CT2<1.5.

13. The optical imaging lens assembly according to claim 1, wherein the at least one subsequent lens includes a fifth lens, and a center thickness CT4 of the fourth lens on the optical axis and a center thickness CT5 of the fifth lens on the optical axis satisfy: 0.5<CT4/CT5≤2.18.

14. The optical imaging lens assembly according to claim 1, wherein a spaced interval T34 between the third lens and the fourth lens on the optical axis and a spaced interval TT-2 between the autofocus component and the second lens on the optical axis satisfy: 1.53≤T34/TT-2<3.5.

15. The optical imaging lens assembly according to claim 1, wherein the second lens has a negative refractive power, the third lens has a negative refractive power, and the fourth lens has a positive refractive power.

* * * * *